US012632915B2

(12) United States Patent
Hu et al.

(10) Patent No.: US 12,632,915 B2
(45) Date of Patent: May 19, 2026

(54) METHOD OF ADJUSTING ACQUISITION PARAMETERS IN A FLUOROSCOPY SYSTEM

(71) Applicant: CANON MEDICAL SYSTEMS CORPORATION, Tochigi (JP)

(72) Inventors: Yi Hu, Vernon Hills, IL (US); Shijie Li, Vernon Hills, IL (US); Joseph Manak, Vernon Hills, IL (US); Shobhit Sharma, Vernon Hills, IL (US); John Baumgart, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 148 days.

(21) Appl. No.: 18/612,731

(22) Filed: Mar. 21, 2024

(65) Prior Publication Data

US 2025/0299279 A1    Sep. 25, 2025

(51) Int. Cl.
*G06T 1/00*        (2006.01)
*G06T 7/00*        (2017.01)
(52) U.S. Cl.
CPC .......... *G06T 1/0007* (2013.01); *G06T 7/0014* (2013.01); *G06T 2207/10121* (2013.01); *G06T 2207/20081* (2013.01); *G06T 2207/20084* (2013.01)
(58) Field of Classification Search
None
See application file for complete search history.

(56) References Cited

U.S. PATENT DOCUMENTS

2015/0139394 A1    5/2015  Kang et al.
2019/0133544 A1    5/2019  Liu et al.

2020/0244865 A1 *  7/2020  Chen ..................... H04N 23/951
2021/0236081 A1 *  8/2021  Gebhardt ............... A61B 6/547
2022/0414832 A1   12/2022  Hu et al.
2023/0038871 A1    2/2023  Van Veen et al.
2024/0242820 A1 *  7/2024  Kshirsagar ............. A61B 6/563

FOREIGN PATENT DOCUMENTS

CN        111281404 A    5/2020
WO    WO-2024/008721 A1    1/2024

OTHER PUBLICATIONS

Extended European Search Report issued Aug. 13, 2025 in European Patent Application No. 25165393.7, citing documents 1-2 and 15 therein, 8 pages.

* cited by examiner

*Primary Examiner* — Edwin C Gunberg
(74) *Attorney, Agent, or Firm* — Oblon, McClelland, Maier & Neustadt, L.L.P.

(57) ABSTRACT

A method of imaging includes obtaining a sequence of X-ray images including a first X-ray image and a second X-ray image, the first and second X-ray images being acquired sequentially using a first set of exposure parameters of an image scanning apparatus; inputting the first and second X-ray images into a trained first model to obtain a second set of exposure parameters, which is output from the trained first model; obtaining a third X-ray image acquired by the image scanning apparatus using the second set of exposure parameters; inputting at least the second X-ray image and the third X-ray image into a trained second model to obtain a restored X-ray third image, which is output from the trained second model; and outputting the restored X-ray third image, wherein the first model and the second model were trained together using a training sequence of images in a training process.

20 Claims, 15 Drawing Sheets

700

701

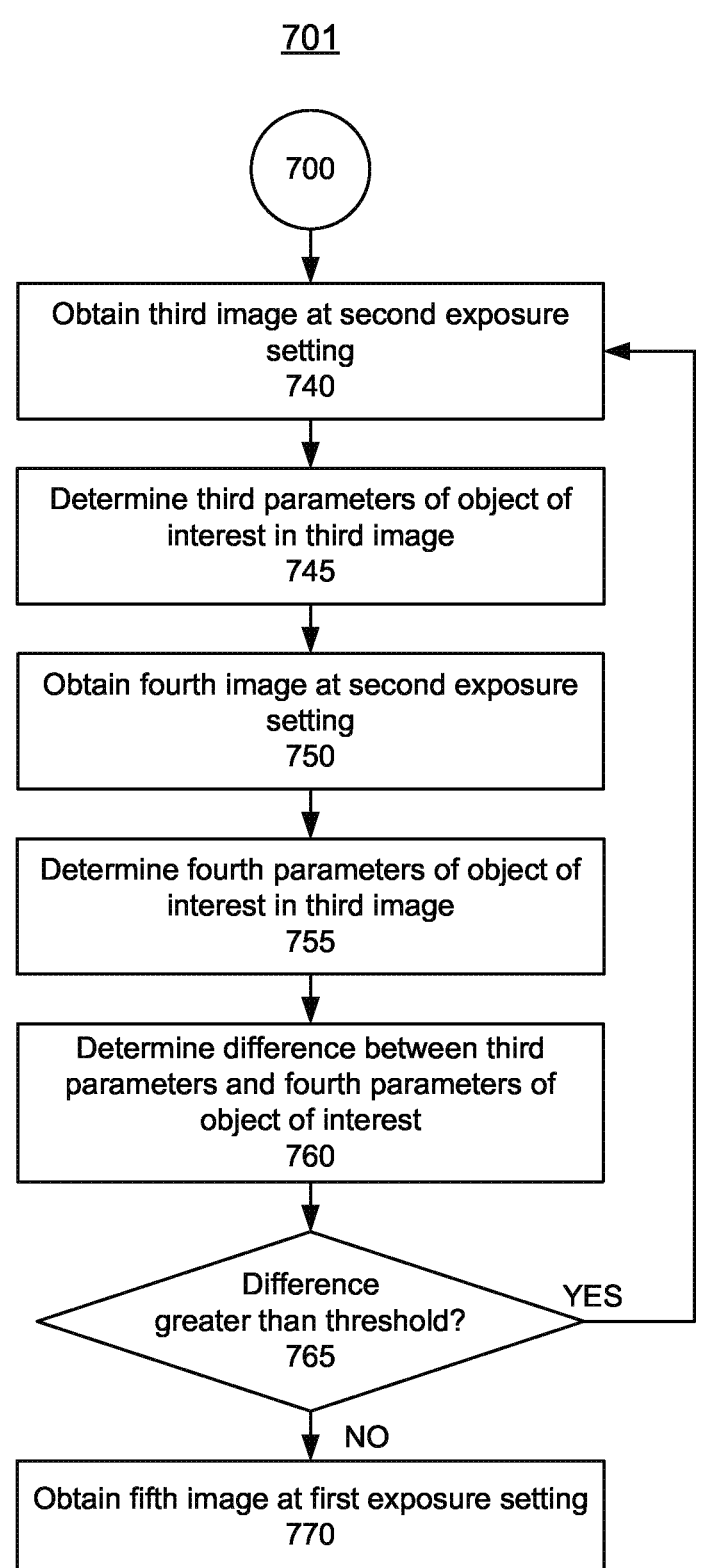

700

Obtain third image at second exposure setting
740

Determine third parameters of object of interest in third image
745

Obtain fourth image at second exposure setting
750

Determine fourth parameters of object of interest in third image
755

Determine difference between third parameters and fourth parameters of object of interest
760

Difference greater than threshold?
765

YES

NO

Obtain fifth image at first exposure setting
770

Figure 7C:
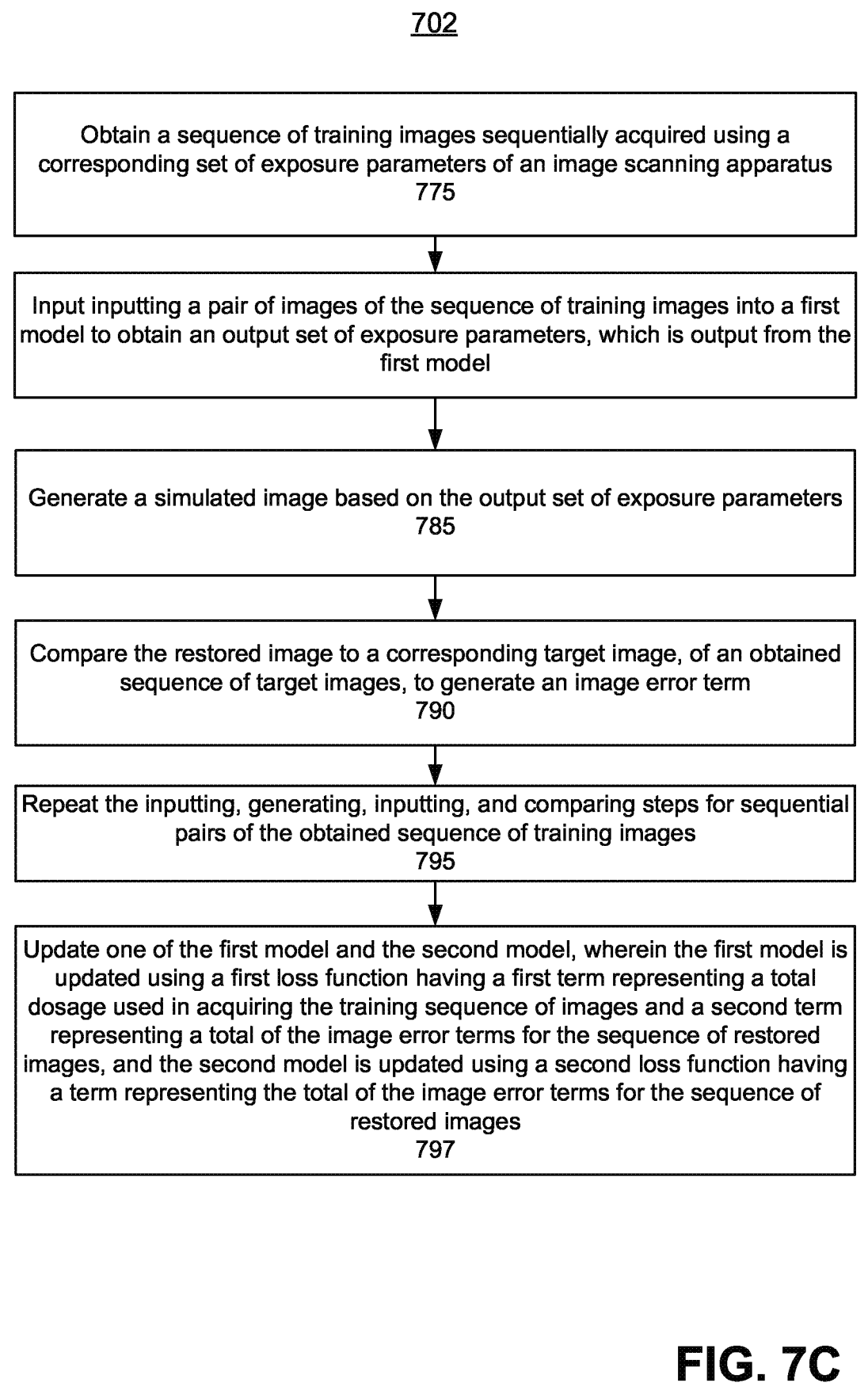

```
┌────────────────────────────────────────────────────────────┐
│  Obtain a sequence of training images sequentially acquired  │
│   using a corresponding set of exposure parameters of an     │
│              image scanning apparatus                        │
│                        775                                   │
└────────────────────────────────────────────────────────────┘
                              │
                              ▼
┌────────────────────────────────────────────────────────────┐
│  Input inputting a pair of images of the sequence of         │
│  training images into a first model to obtain an output set  │
│  of exposure parameters, which is output from the            │
│                     first model                              │
└────────────────────────────────────────────────────────────┘
                              │
                              ▼
┌────────────────────────────────────────────────────────────┐
│  Generate a simulated image based on the output set of       │
│              exposure parameters                             │
│                        785                                   │
└────────────────────────────────────────────────────────────┘
                              │
                              ▼
┌────────────────────────────────────────────────────────────┐
│  Compare the restored image to a corresponding target        │
│  image, of an obtained sequence of target images, to         │
│          generate an image error term                        │
│                        790                                   │
└────────────────────────────────────────────────────────────┘
                              │
                              ▼
┌────────────────────────────────────────────────────────────┐
│  Repeat the inputting, generating, inputting, and comparing  │
│  steps for sequential pairs of the obtained sequence of      │
│                   training images                            │
│                        795                                   │
└────────────────────────────────────────────────────────────┘
                              │
                              ▼
┌────────────────────────────────────────────────────────────┐
│  Update one of the first model and the second model,         │
│  wherein the first model is updated using a first loss       │
│  function having a first term representing a total           │
│  dosage used in acquiring the training sequence of images    │
│  and a second term representing a total of the image error   │
│  terms for the sequence of restored images, and the second   │
│  model is updated using a second loss function having        │
│  a term representing the total of the image error terms for  │
│  the sequence of restored images                             │
│                        797                                   │
└────────────────────────────────────────────────────────────┘
```

Obtain a sequence of a plurality of images including a first image and a second image, the first and second images being acquired sequentially using a first set of exposure parameters of an image scanning apparatus
805

Obtain the obtained first and second images into a trained first model to obtain a second set of exposure parameters, which is output from the trained first model
810

Obtain a third image that was acquired by the image scanning apparatus using the obtained second set of exposure parameters
815

Input at least the obtained second image and the obtained third image into a trained second model to obtain a restored third image, which is output from the trained second model
820

Output the restored third image
825

FIG. 7D

METHOD OF ADJUSTING ACQUISITION PARAMETERS IN A FLUOROSCOPY SYSTEM

FIELD

This disclosure relates to a method for acquiring an image using customized dose control via a fluoroscopy system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The image quality of fluoroscopy sequences can depend on both exposure conditions and image restoration processes. In some exposure control processes, the acquisition or exposure parameters of one frame (e.g., mA, ms, kV, filters, etc.) can be determined based on the contents (e.g., a histogram) of a current frame to maximize the image quality (e.g., contrast-to-noise ratio). However, the exposure dose can be set generally low during fluoroscopy procedures, which can present challenges for the downstream image denoising or image restoration processes. Thus, a method providing varying, customized acquisition parameters during fluoroscopy procedures prior to the image denoising and image restoration processes is desired.

SUMMARY

The present disclosure relates to an imaging apparatus, including processing circuitry configured to obtain a sequence of a plurality of X-ray images including a first X-ray image and a second X-ray image, the first and second X-ray images being acquired sequentially using a first set of exposure parameters of an image scanning apparatus, input the obtained first and second X-ray images into a trained first model to obtain a second set of exposure parameters, which is output from the trained first model, obtain a third X-ray image that was acquired by the image scanning apparatus using the obtained second set of exposure parameters, input at least the obtained second X-ray image and the obtained third X-ray image into a trained second model to obtain a restored third X-ray image, which is output from the trained second model, and output the restored third X-ray image, wherein the first model and the second model were trained together using a training sequence of X-ray images in a training process, and during the training process, inputs to the second model are based on outputs of the first model, and the second model outputs a sequence of restored X-ray images based on the training sequence of images.

The disclosure additionally relates to an apparatus, including processing circuitry configured to perform a training process by obtaining a sequence of training X-ray images sequentially acquired using a corresponding set of exposure parameters of an image scanning apparatus, inputting a pair of X-ray images of the sequence of training X-ray images into a first model to obtain an output set of exposure parameters, which is output from the first model, generating a simulated X-ray image based on the output set of exposure parameters, inputting the generated simulated X-ray image into a second model to obtain a restored X-ray image, which is output from the second model, comparing the restored X-ray image to a corresponding target X-ray image, of an obtained sequence of target X-ray images, to generate an image error term, repeating the inputting, generating, inputting, and comparing steps for sequential pairs of the obtained sequence of training X-ray images, and updating one of the first model and the second model.

The disclosure additionally relates to a method, including obtaining a sequence of a plurality of X-ray images including a first X-ray image and a second X-ray image, the first and second X-ray images being acquired sequentially using a first set of exposure parameters of an image scanning apparatus; inputting the obtained first and second X-ray images into a trained first model to obtain a second set of exposure parameters, which is output from the trained first model; obtaining a third X-ray image that was acquired by the image scanning apparatus using the obtained second set of exposure parameters; inputting at least the obtained second X-ray image and the obtained third X-ray image into a trained second model to obtain a restored X-ray third image, which is output from the trained second model; and outputting the restored X-ray third image, wherein the first model and the second model were trained together using a training sequence of images in a training process, and during the training process, inputs to the second model are based on outputs of the first model, and the second model outputs a sequence of restored X-ray images based on the training sequence of images.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein:

FIG. 7A and FIG. 7B show a non-limiting example of a flow chart for a method of acquisition parameter adjustment, according to an embodiment of the present disclosure;

FIG. 7C shows a non-limiting example of a flow chart for a method of acquisition parameter adjustment, according to an embodiment of the present disclosure;

FIG. 7D shows a non-limiting example of a flow chart for a method of acquisition parameter adjustment, according to an embodiment of the present disclosure;

DETAILED DESCRIPTION

Figure 1:
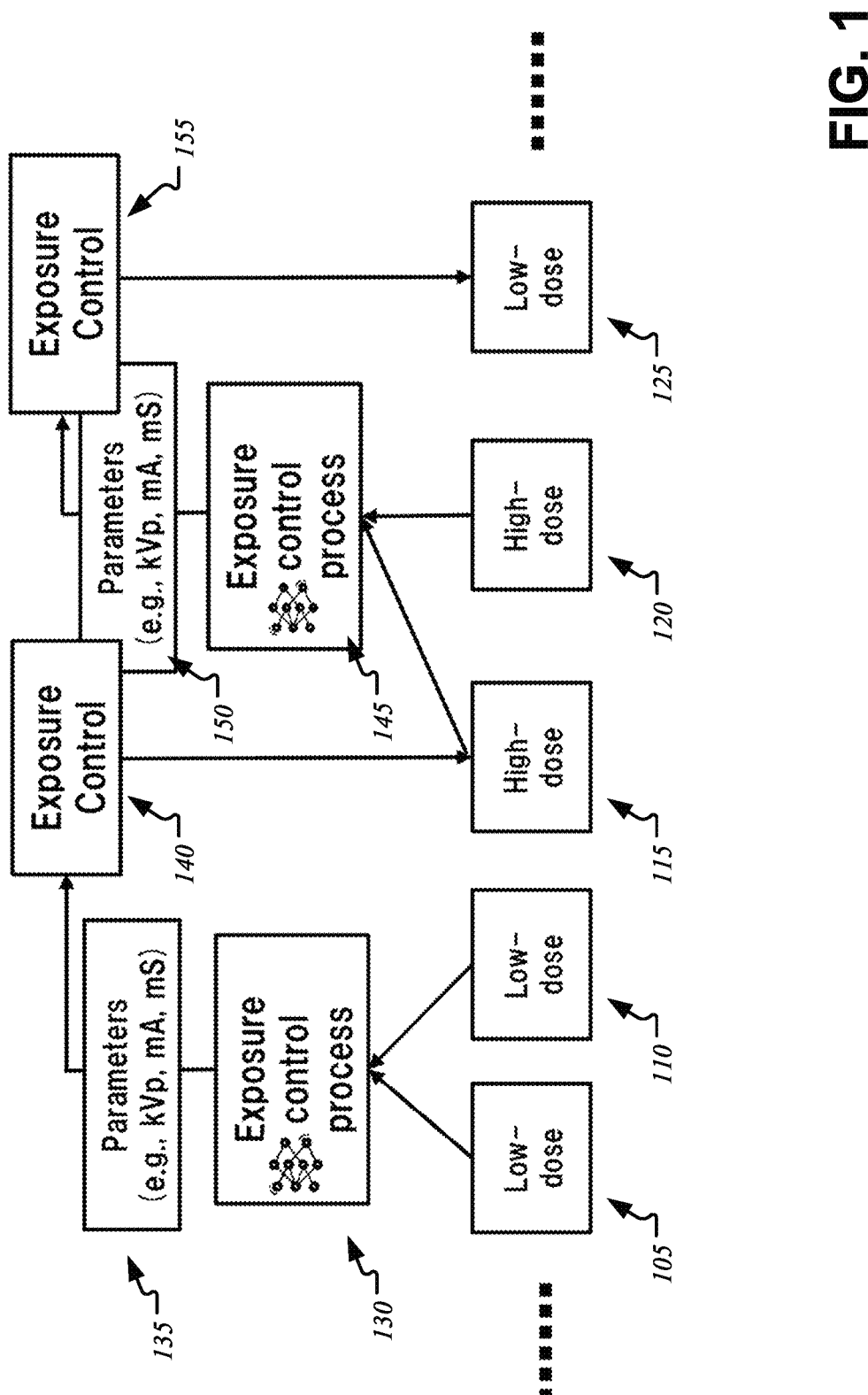
FIG. 1 is a schematic describing the acquisition parameter adjustment process, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

X-ray imaging systems and methods are widely used medical imaging tools for diagnosis and clinical interventions. Radiography systems are essential tools in interventional radiology procedures which may vary from a few minutes to several hours. Radiography systems generally create two-dimensional projection images through a subject's body. A radiation source, such as an X-ray tube, irradiates the body from one side. A collimator, generally adjacent to the X-ray source, limits the angular extent of the X-ray beam, so that radiation impinging on the body is substantially confined to a cone-beam/fan-beam region (i.e., an X-ray projection volume) defining an image volume of the body. At least one detector on the opposite side of the body receives radiation transmitted through the body substantially in the projection volume. The attenuation of the radiation that has passed through the body is measured by processing electrical signals received from the detector.

In both fluoroscopic mode and acquisition mode, a sequence of X-ray exposures can be collected at a selected frame rate with a dose, tube voltage, scan time, etc. In clinical practice, an object of interest in the image for a radiologist or operator can vary frequently (for example from a guide wire, to a catheter, iodinated blood vessel, or a stent) during the interventional procedure, and exposure parameters can be adjusted to better image the object of interest. Notably, during time periods where there is not as much movement or change for the object of interest, the exposure parameters can be adjusted to reduce a dose or radiation exposure level to a patient.

Some fluoroscopy systems can implement an image restoration process after an image is obtained by the system. In some fluoroscopy systems, noise reduction and contrast increase can be desired targets for automatic exposure determination and adjustment. Some automatic exposure control processes can control the fluoroscopy system in a way to maximize the output image quality from a physics perspective.

Image restoration processes can depend on prior information. For example, image sequences can provide prior information that can be used for image restoration. Notably, exposure control can depend on a histogram of an image (in the image sequence) and can be handled separately from the later image restoration process. This method of handling exposure control does not necessarily use the prior information.

Thus, described herein is a system and method for acquisition parameter adjustment that can control the acquisition parameters via the image restoration process.

In one embodiment, a neural network can be used to identify informative frames (or informative scenarios, or informative images). As described herein, an informative frame can be a frame or image including a change or difference as compared to a previous frame (or frames). For example, an informative frame can be a frame including an object, such as a stent, being deployed where a previous frame did not include the stent or the stent position had not changed beyond a threshold parameter. For example, an informative frame can be a frame including vessels where a contrast agent has been injected where a previous frame did not include the injected contrast agent. For example, an informative frame can be a frame including an object of interest changing characteristics or parameters quickly or often, such as regions including blood flow, a heartbeat, etc. In general, informative frames are frames or images where a noticeable event or changes are occurring. Therefore, a more accurate or less noisy acquisition of the informative frames, and the frames subsequent to the informative frames, can be desired.

In one embodiment, upon determining a frame is an informative frame, exposure parameters can be adjusted based on the informative frame. The exposure parameters can include, but are not limited to, a dose, an acquisition frame rate, an acquisition time, a voltage, and a filter. The exposure parameters can be used to obtain the informative frames having more optimized exposure parameters.

In one embodiment, a neural network can be used to analyze the informative frames and corresponding exposure parameters as training data. Notably, simulated images and clinical images can be used as the training data.

To this end, FIG. 1 is a schematic describing the acquisition parameter adjustment process, according to an embodiment of the present disclosure. In one embodiment, a first image 105 can be obtained via a fluoroscopy system with a first exposure setting or exposure parameters. The fluoroscopy system can include, for example, an X-ray source configured to emit X-ray radiation at a predetermined intensity, and processing circuitry, such as a computer, to analyze any images obtained by the fluoroscopy system. Notably, the first image 105 can be a low-dose image, as shown. The low dose of the first image 105 can be understood to mean that the first image 105 was obtained using an exposure parameter that includes a low dose setting or low radiation level for the X-ray source (or other radiation source in other imaging systems). The first image 105 can be analyzed by the processing circuitry (the fluoroscopy system) to identify any object of interest disposed in the first image 105, for example a stent. In the first image 105, the processing circuitry can determine first parameters of the object of interest, such as a first location of the object of interest.

In one embodiment, a second image 110 can be obtained via the fluoroscopy system with the first exposure setting. The second image 110 can also be a low-dose image, as shown. The second image 110 can be analyzed by the processing circuitry to identify the object of interest disposed in the second image 110 and second parameters of the object of interest, such as a second location of the object of interest. For example, the object of interest can move between acquisitions and the second location of the object of interest is not the same as the first location. The processing circuitry can determine a difference between the first parameters and the second parameters, such as the first location and the second location. The difference between the first location and the second location can be described as a change in distance. The difference between the first location and the second location can be used to determine whether the first image 105 and the second image 110 are informative frames.

In one embodiment, a first exposure control process 130 performed by the processing circuitry (the fluoroscopy system) can analyze the first image 105 and the second image 110 to determine whether the first image 105 and the second image 110 are informative frames. Again, the object of interest (or multiple objects of interest) can be determined in the first image 105 and the second image 110, as well as the corresponding first parameters and the corresponding second parameters (e.g., the corresponding first location and the corresponding second location). Upon determining the difference between the first location of the object of interest in the first image 105 and the second location of the object of interest in the second image 110 is greater than a predetermined threshold (or certain threshold or set threshold or target threshold), the exposure control process can determine that the first image 105 and the second image 110 are informative frames. That is, the first image 105 and the second image 110 include a change in the object of interest that can be imaged at a higher dose or exposure in order to obtain an image with less noise compared to the same image obtained at a lower dose.

In one embodiment, denoising need not be the target goal of increasing the exposure. For example, the informative frames can inform something other than denoising. For example, general tracking of the object of interest can be the target goal. For example, higher dose images can localize the object of interest that can be tracked later in a lower dose image. Higher dose image acquisitions can thus establish parameters of the object of interest, such as a shape, size, etc. of the object of interest being tracked through lower dose image acquisitions without having to have the future low dose image acquisitions be as high dose while still tracking the object of interest effectively or more accurately compared to a process using only low dose image acquisitions.

In one embodiment, the first parameters (and the second parameters and the parameters of the object of interest in subsequent acquisitions) can be, for example, a geometry of the object of interest, a size of the object of interest, a density of the object of interest, or any other measurable characteristics of the object of interest as the object of interest appears in the image or is represented in the imaging (projection) data. In one example, the object of interest is an artery with blood flow, and a changing density (or corresponding changing brightness/contrast) of the blood flow can signal that the frames or images capturing the blood flow are informative frames.

In one embodiment, upon determining that the first image 105 and the second image 110 are informative frames, the fluoroscopy system can adjust first exposure parameters 135 via a first exposure control 140. The first exposure parameters 135 can be adjusted based on the informative frames, such as the exposure parameters of the informative frames, the object of interest in the informative frames, and determined image parameters of the informative frames (brightness, contrast, etc.). The first exposure control 140 can be configured to adjust, for example, the dose, voltage, frame rate, filter, etc. in the first exposure parameters 135. As shown in FIG. 1, the first exposure control 140 can increase the dose, followed by acquisition of a third image 115. Thus, the third image 115 can be labeled as a high-dose image. Similarly, a fourth image 120 can be obtained, also at the high dose.

In one embodiment, upon determining the first image 105 and the second image 110 are not informative frames, the fluoroscopy system can maintain the current first exposure parameters 135 used to obtain the subsequent images, which can continue to be considered low-dose images. For example, the fluoroscopy system can determine that the difference between the first location of the object of interest in the first image 105 and the second location of the object of interest in the second image 110 is not greater than the predetermined threshold, and therefore maintain the low dose used to obtain the images.

In one embodiment, the processing circuitry can analyze the second image 110 and the third image 125 to determine whether the second image 110 and the third image 125 are informative frames. Again, the object of interest (or multiple objects of interest) can be determined in the second image 110 and the third image 125, and the corresponding second location for the object of interest in the second image 110 and a corresponding third location for the object of interest in the third image 115. Upon determining that the difference between the second location of the object of interest in the second image 110 and the third location of the object of interest in the third image 115 is still greater than the predetermined threshold, the high dose can be maintained.

In one embodiment, a second exposure control process 145 performed by the processing circuitry can analyze the third image 115 and the fourth image 120 to determine whether the third image 115 and the fourth image 120 are informative frames. Again, the object of interest (or multiple objects of interest) can be determined in the third image 115 and the fourth image 120, and the corresponding third location for the object of interest in the third image 115 and a corresponding fourth location for the object of interest in the fourth image 120. Upon determining that the difference between the third location of the object of interest in the third image 115 and the fourth location of the object of interest in the fourth image 120 is not greater than the predetermined threshold, the exposure control process can determine that the third image 115 and the fourth image 120 are not informative frames. That is, the first image 105 and the second image 110 include negligible changes or no changes in the object of interest. For example, this can occur in a clinical setting where the patient is being imaged during a medical procedure, but the medical professionals are not currently adjusting the object of interest. For example, a surgeon can guide a stent into the imaging area and leave the stent in place momentarily. Thus, the high dose imaging can be used while guiding the stent into place, but the patient need not be exposed to the high dose once the stent is (temporarily or permanently) arranged because the imaging of the object of interest at a high resolution or low noise quality is not needed at the current time.

In one embodiment, upon determining the third image 115 and the fourth image 120 are not informative frames, the fluoroscopy system can adjust second exposure parameters 150 via a second exposure control 155. The second exposure parameters 150 can be adjusted back to a low dose, or a dose lower than a dose used to obtain the third image 115 and the fourth image 120 that were considered high-dose images. The second exposure control 155 can be configured to adjust, for example, the dose, voltage, imaging time, frame rate, filter, etc. in the second exposure parameters 150. As shown in FIG. 1, the second exposure control 155 can decrease the dose, followed by acquisition of a fifth image 125. Thus, the fifth image 125 can be labeled as a low-dose image.

In one embodiment, the first exposure control 140 and the second exposure control 155 can be an application or module included in the fluoroscopy system configured to receive data regarding the informative frames and/or data regarding the exposure parameters used to obtain the informative frames, and adjust the fluoroscopy system. For example, the first exposure control 140 and the second exposure control 155 can be configured to adjust the exposure parameters described previously, such as the dose, voltage, frame rate, filter, etc. The first exposure control 140 and the second exposure control 155 can be configured to adjust the exposure parameters by a processor, such as an ASIC, FPGA, etc. In one embodiment, the first exposure control 140 and the second exposure control 155 can be configured to adjust the exposure parameters via manual input from a user, such as technician. For example, the technician can continually monitor generated images and adjust the exposure parameters using an input device, such as a software program configured to adjust the exposure parameters, a physical feature (e.g., knob, slider, button, switch, etc.) on the instrument or the computing device, etc. Updated images can be generated based on the adjusted exposure parameters, which can be further analyzed an adjusted. For example, in the case of the manual input, the technician can visually inspect and analyze the updated images in order to further adjust the exposure parameters. For example, in the case of the processor or computing device, the trained model can receive the updated images as an input and use the trained model to further adjust the exposure parameters.

In one embodiment, the first exposure control process 130 (and the second exposure control process 145 and any additional exposure control processes) can be a neural network configured to receive image data as an input. An output of the neural network can be a determination regarding whether the images corresponding to the image data are informative frames. That is, for example, the first exposure control process 130 and the second exposure control process 145 can receive two of the obtained images and determine whether the images include the object of interest and whether there is a significant change for the object of interest between the two images. For example, the first exposure control process 130 and the second exposure control process 145 can determine whether the difference between the first location of the object of interest in the first image 105 and the second location of the object of interest in the second image 110 is greater than the predetermined threshold.

In one embodiment, the image data input for the first exposure control process 130 and the second exposure control process 145 can include 2 or more images (or frames). The images or frames can also be used as an input into an image restoration process, the image restoration process using a neural network in order to restore images. The resulting restored images, and the quality of the restored images, can be used as feedback to the acquisition parameter adjustment process. In particular, the quality of the restored images can be used as feedback to the exposure control processes (described below).

Figure 2:
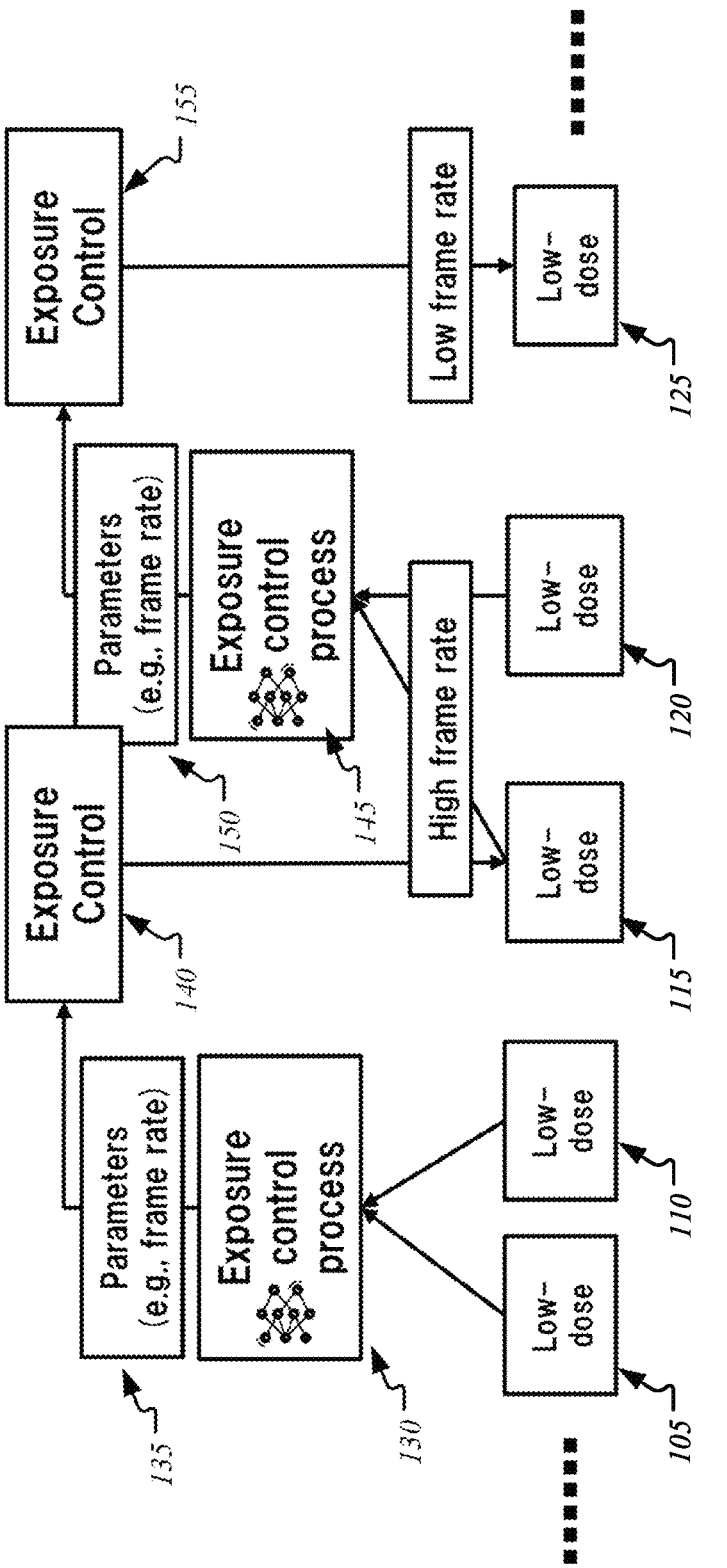
FIG. 2 is a schematic describing the acquisition parameter adjustment process via frame rate adjustment, according to an embodiment of the present disclosure.

FIG. 2 is a schematic describing the acquisition parameter adjustment process via frame rate adjustment, according to an embodiment of the present disclosure. In one embodiment, the first image 105 can be obtained via the fluoroscopy system with the first exposure setting. Notably, the first image 105 can be a low-dose image, as shown. The low dose of the first image 105 can be understood to mean that the first image 105 was obtained using the exposure parameter that includes the low exposure or dose setting for the radiation source. The first image 105 can be analyzed by the processing circuitry to identify any object of interest disposed in the first image 105, for example a stent. In the first image 105, the processing circuitry can determine the first location of the object of interest.

In one embodiment, the second image 110 can be obtained via the fluoroscopy system with the first exposure setting. The second image 110 can also be a low-dose image, as shown. The second image 110 can be analyzed by the processing circuitry to identify the object of interest disposed in the second image 110 and the second location of the object of interest. For example, the object of interest can again move between acquisitions and the second location of the object of interest is not the same as the first location. The difference between the first location and the second location can be used to determine whether the first image 105 and the second image 110 are informative frames.

In one embodiment, the first exposure control process 130 performed by the processing circuitry (the fluoroscopy system) can analyze the first image 105 and the second image 110 to determine whether the first image 105 and the second image 110 are informative frames. Again, the object of interest (or multiple objects of interest) can be determined in the first image 105 and the second image 110, as well as the corresponding first location and the corresponding second location. Upon determining that the difference between the first location of the object of interest in the first image 105 and the second location of the object of interest in the second image 110 is greater than the predetermined threshold, the exposure control process can determine that the first image 105 and the second image 110 are informative frames. That is, the first image 105 and the second image 110 include a change in the object of interest that can be imaged at a higher dose or exposure in order to obtain an image with less noise compared to the same image obtained at a lower dose. As previously described, denoising need not be the target goal of increasing the exposure, and other target goals can be desired.

In one embodiment, upon determining that the first image 105 and the second image 110 are informative frames, the fluoroscopy system can adjust the first exposure parameters 135 via the first exposure control 140. The first exposure parameters 135 can be adjusted based on the informative frames, such as the exposure parameters of the informative frames, the object of interest in the informative frames, and determined image parameters of the informative frames (brightness, contrast, etc.). The first exposure control 140 can be configured to adjust, for example, the dose, voltage, frame rate, filter, etc. in the first exposure parameters 135. As shown in FIG. 1, the first exposure control 140 can increase the frame rate, followed by acquisition of the third image 115. Thus, the third image 115 can be labeled as still a low-dose image, but acquired at the high frame rate. Similarly, the fourth image 120 can be obtained, also at the high frame rate.

In one embodiment, upon determining that the first image 105 and the second image 110 are not informative frames, the fluoroscopy system can maintain the current first exposure parameters 135 used to obtain the subsequent images, which can continue to be considered low-dose images and also at the low frame rate. For example, the fluoroscopy system can determine that the difference between the first location of the object of interest in the first image 105 and the second location of the object of interest in the second image 110 is not greater than the predetermined threshold, and therefore maintain the low frame rate (and dose) used to obtain the images.

In one embodiment, the second exposure control process 145 performed by the processing circuitry can analyze the third image 115 and the fourth image 120 to determine whether the third image 115 and the fourth image 120 are informative frames. Again, the object of interest (or multiple objects of interest) can be determined in the third image 115 and the fourth image 120, and the corresponding third location for the object of interest in the third image 115 and the corresponding fourth location for the object of interest in the fourth image 120. Upon determining that the difference between the third location of the object of interest in the third image 115 and the fourth location of the object of interest in the fourth image 120 is not greater than the predetermined threshold, the exposure control process can determine that the third image 115 and the fourth image 120 are not informative frames. That is, the first image 105 and the second image 110 include negligible changes or no changes in the object of interest.

In one embodiment, upon determining that the third image 115 and the fourth image 120 are not informative frames, the fluoroscopy system can adjust second exposure parameters 150 via the second exposure control 155. The second exposure parameters 150 can be adjusted back to a low frame rate, or a frame rate less frequent than a frame rate used to obtain the third image 115 and the fourth image 120 that were obtained using the high frame rate. As shown in FIG. 2, the second exposure control 155 can decrease the frame rate, followed by acquisition of the fifth image 125.

In one embodiment, although described as being parameters adjusted separately, the aforementioned parameters can be adjusted together. That is, the dose level and the frame rate can be adjusted together in order to obtain subsequent images that includes less noise. By extension, the dose can be adjusted in combination with a different parameters, such as the acquisition time.

Figure 3:
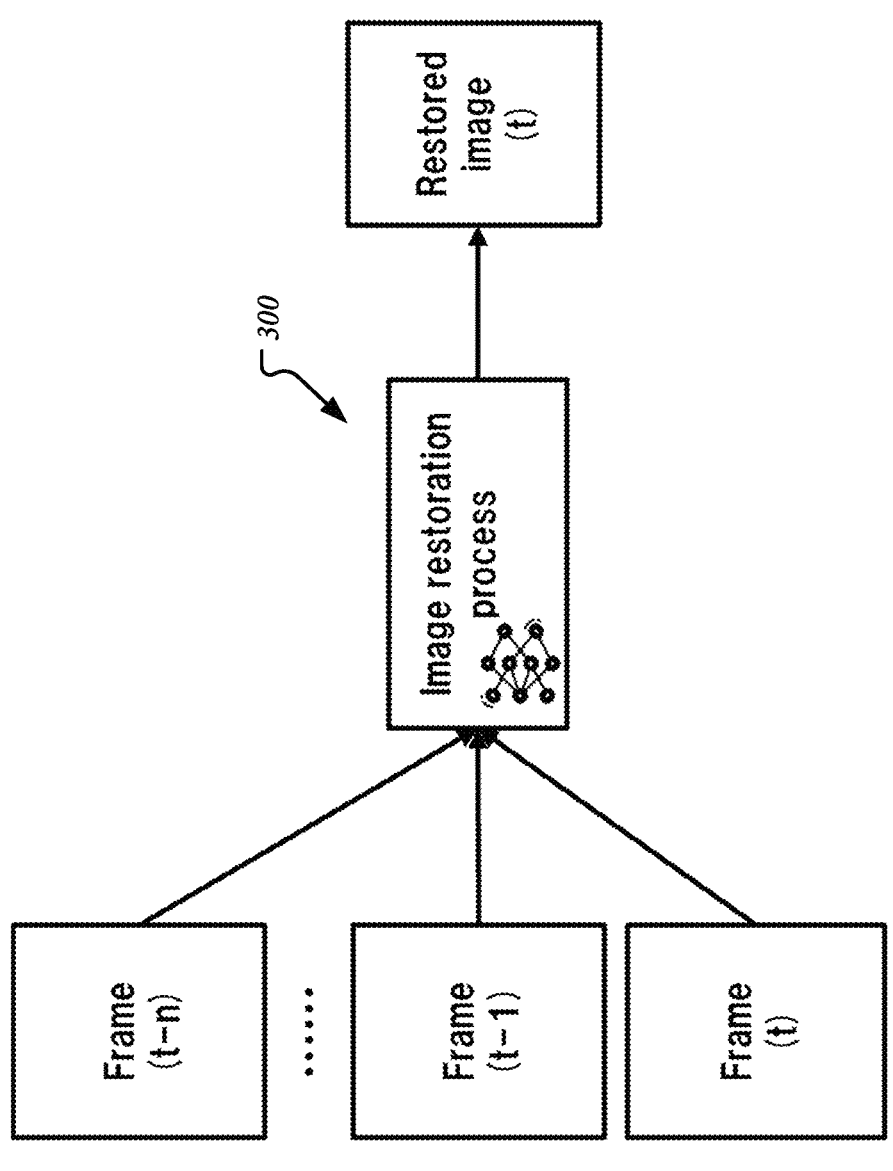
FIG. 3 is a schematic of an image restoration process, according to an embodiment of the present disclosure.

FIG. 3 is a schematic of an image restoration process 300, according to an embodiment of the present disclosure. As previously mentioned, a sequence of images or frames can be used as the input into the image restoration process 300. The image restoration process 300 can include a neural network trained to restore the images. In an embodiment, the neural network for restoring the images can be used to improve the image quality. The image restoration process 300 can include denoising, deblurring, artifact removal, etc. The image data input for the image restoration process 300 can include 2 or more images (or frames). As shown, a current frame (t), a previous frame (t−1), and up to any number of frames (t−n) can be used as the input into the image restoration process 300, which generates a restored image. Again, the resulting restored images, and the quality of the restored images, can be used as feedback to the acquisition parameter adjustment process. In particular, the quality of the restored images can be used as feedback to the exposure control processes.

Figure 4:
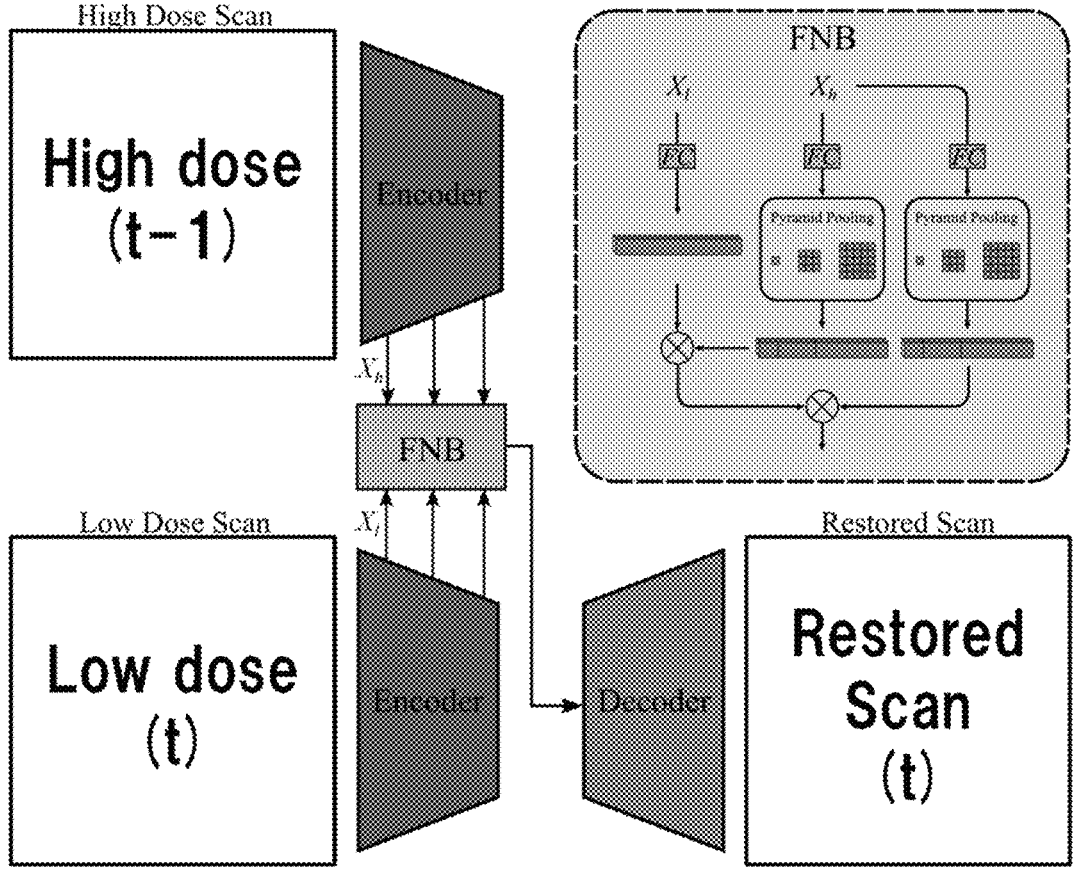
FIG. 4 is a schematic describing a neural network architecture for image restoration, according to an embodiment of the present disclosure.

FIG. 4 is a schematic describing a neural network architecture for image restoration, according to an embodiment of the present disclosure. In one embodiment, the neural network input can include the image data, which can include a sequence of images, such as those obtained by the fluoroscopy system. The neural network architecture can include a first encoder and a second encoder configured to extract features from the images with different exposure parameters. The encoders generally can be configured to transform high-dimensional input data into a lower-dimensional representation that retains essential information for further processing in various machine learning tasks. For example, the first encoder can be configured to extract features from the high-dose images, and the second encoder can be configured to extract features from the low-dose images. The encoders can be used in various other neural network architectures, including autoencoders, convolutional neural networks (CNNs), and recurrent neural networks (RNNs).

In one embodiment, the neural network architecture can also include a Non-local Block, or in particular, a Fuse Non-local Block (FNB). A Non-Local Block can be an image block module used in neural networks that wraps a non-local operation or captures long-range dependencies in data, such as image data. The FNB can function by allowing each element in the input to interact with all other elements regardless of the spatial or temporal distance between the elements, while also fusing the features from the images with different exposure settings. For example, the FNB can help the neural network determine any connections between the images by calculating a similarity value between all pairs of positions in the images. The similarity value can be used to adjust an importance or score of each pixel in the image, so that pixels that are more related to one another are given more weight.

In one embodiment, the neural network can include a decoder configured to accept the fused feature from the images as an input in order to generate and output the restored image. For example, the neural network architecture can use an autoencoder including an encoder and a decoder, where the encoder maps input data to a lower-dimensional latent space representation (latent vectors), and the decoder attempts to reconstruct the original data from the lower-dimensional latent space representation. By attempting to match its outputs to its inputs, the autoencoder can learn to grasp relevant information and ignore insignificant data. Autoencoders can be used in tasks such as data compression, denoising, and anomaly detection.

Notably, the neural network for the first exposure control process 130 (or the second exposure control process 145) and the neural network for the image restoration process 300 can be trained alternatively.

Figure 5:
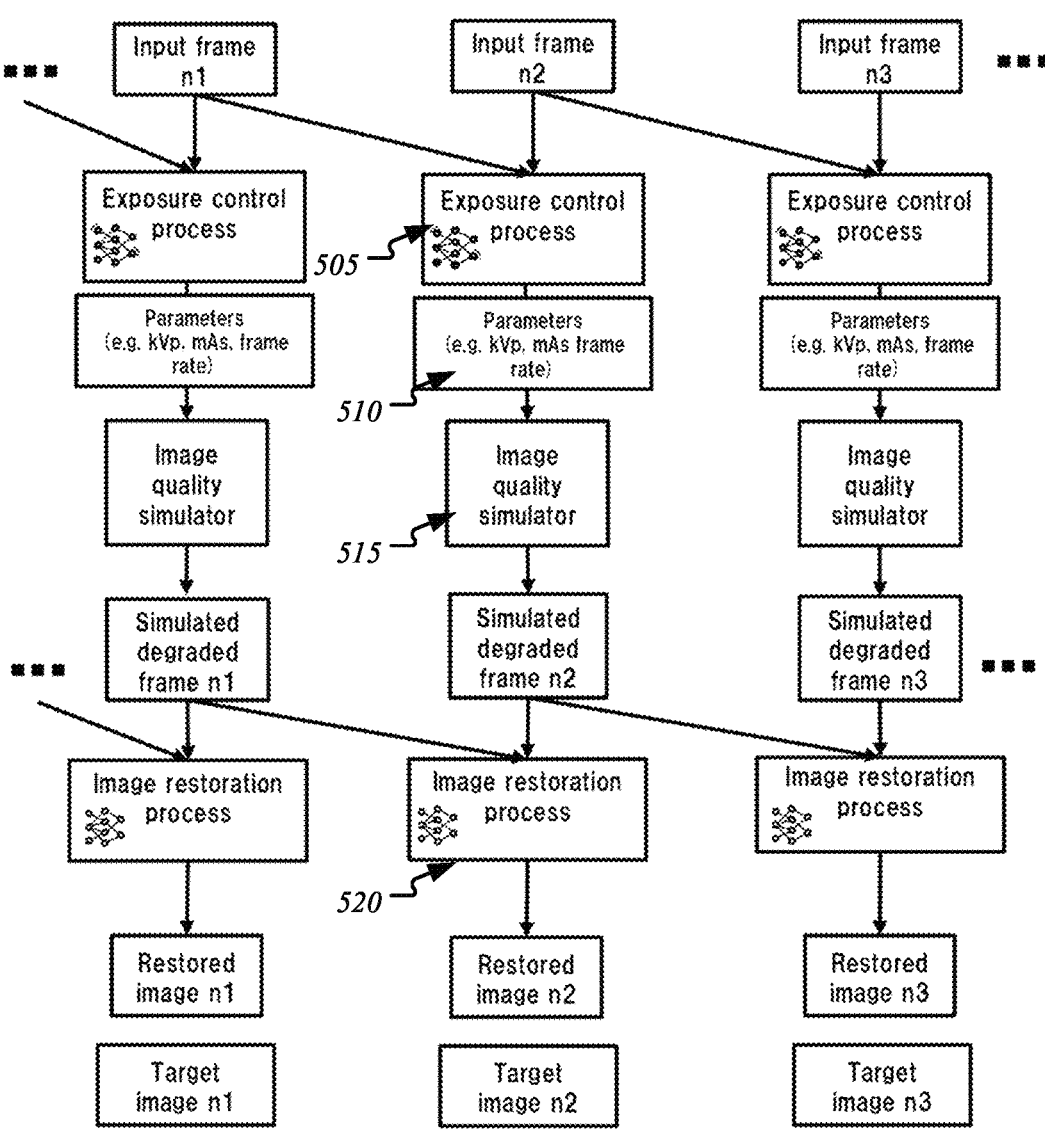
FIG. 5 is a schematic describing the neural network training, according to an embodiment of the present disclosure.

To this end, FIG. 5 is a schematic describing the neural network training, according to an embodiment of the present disclosure. In one embodiment, the neural network for the image restoration process 300 can be fixed while the neural network for the first exposure control process 130 can be trained. With reference to FIG. 5, a first input frame n1 and a second input frame n2 can be inputs for an exposure control process 505 having a neural network for training. An image quality simulator 515 can be configured to simulate a simulated degraded frame n2. The image quality simulator 515 can simulate the images based on the input including exposure parameters 515 (similar to the exposure parameters described previously). A loss function for the exposure control process 505 can be defined to (i) maximize an image quality of the entire sequence of the images, and (ii) minimize the dose level used to obtain the entire sequence of the images. The loss function for the exposure control process 505 can be described by, for example, $$L = \frac{1}{n}\sum_{i=0 \ to \ n}|\text{pred}_i - \text{target}_i| + \frac{1}{n}\sum_{i=0 \ to \ n}\text{dose}_i$$

where n is the total frame number of the sequence. As shown, multiple of the sequences of the images can be used for the neural network training.

In one embodiment, the neural network for the exposure control process 505 can be fixed while the neural network for an image restoration process 520 can be trained. As shown in FIG. 5, a simulated degraded frame n1 and the simulated degraded frame n2 can be inputs for the image restoration process 520 having a neural network for training. The output of the image restoration process 520 can be a restored image n2. This can be compared to a target image n2, and further training and modifications to the neural networks can be performed to improve the accuracy of the output of the image restoration process 520. A loss function for the image restoration process 520 can be defined to maximize the image quality of each individual image or frame. The loss function for the image restoration process 520 process can be described by, for example, $$L = \sum|\text{pred}_i - \text{target}_i|$$

The training datasets can be generated according to various processes. To this end, FIG. 6A and FIG. 6B are schematics describing training dataset generation, according to an embodiment of the present disclosure.

Figure 6A:
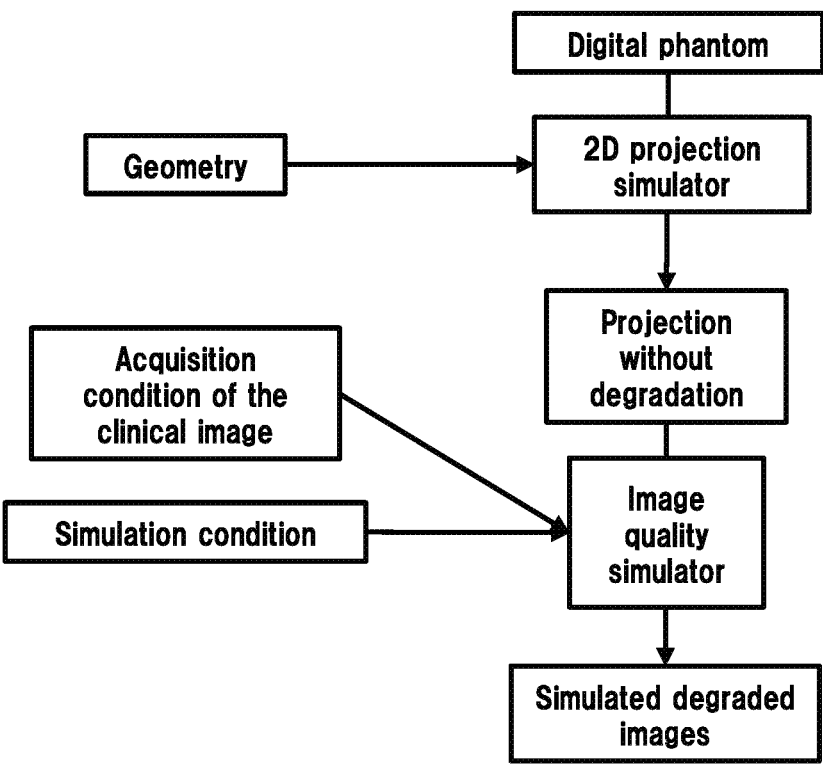
FIG. 6A and FIG. 6B are schematics describing training dataset generation, according to an embodiment of the present disclosure.

In one embodiment, FIG. 6A describes the use of phantoms (digital or real). The phantom can be an object with known parameters (such as size, geometry, density, etc.) that is imaged using the fluoroscopy system to evaluate, analyze, and optimize the performance of the fluoroscopy system. Notably, the phantom can be used with 3D device models to simulate interventional procedures, and noise can be added to high dose and low dose frames. As shown, data from the phantom, along with the known characteristics of the phantom (e.g., the phantom geometry) can be used as inputs for a 2D projection simulator to generate projection data (an image) without degradation included. Known acquisition parameters and simulation parameters, along with the projection data without degradation can be used as inputs for an image quality simulator to generate simulated degraded images for the training datasets.

Figure 6B:
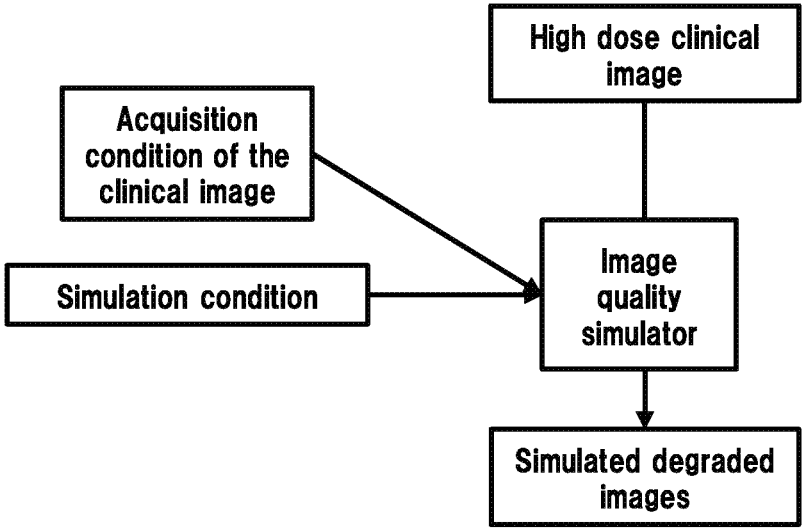

In one embodiment, FIG. 6B shows the use of high-dose frames with known additions of noise. A high-dose image, such as a high-dose image obtained in a clinical setting, along with the acquisition parameters and the simulation parameters as the inputs for the image quality simulator to generate the simulated degraded images for the training datasets.

In an embodiment, the neural network for the exposure control process 505 can be trained together with the neural network for the image restoration process 520 using a training sequence of images in a training process. During the training process, inputs to the neural network for the image restoration process 520 can be based on outputs of the neural network for the exposure control process 505, and the neural network for the image restoration process 520 outputs a sequence of restored images based on the training sequence of images. The neural network for the exposure control process 505 can be trained using a first loss function having a first term representing a total dosage used in acquiring the training sequence of images and a second term representing a total error in the sequence of restored images, as described above. The neural network for the image restoration process 520 can be trained using a second loss function having a term representing the total error in the sequence of restored images, as described above. Notably, the neural network for the exposure control process 505 can be trained alternatively with the neural network for the image restoration process 520.

Figure 7A:
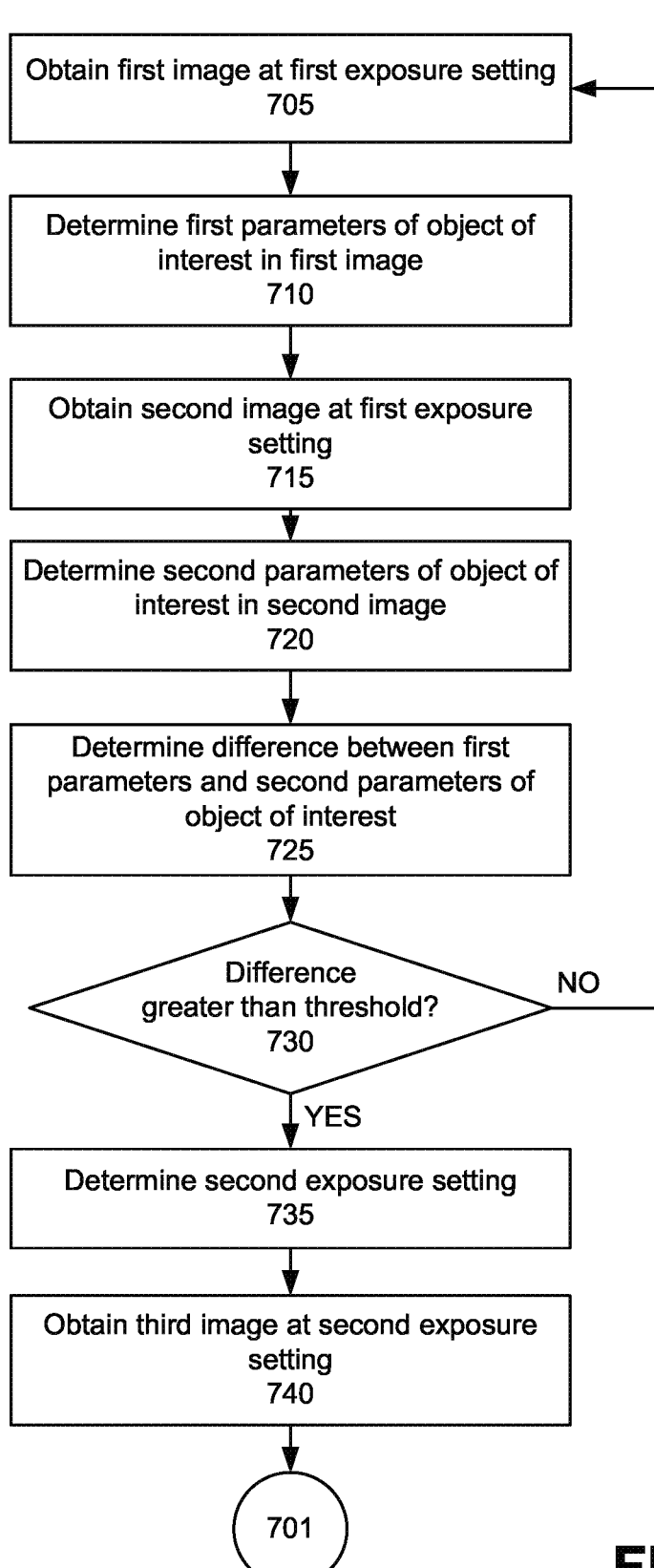

FIG. 7A and FIG. 7B show a non-limiting example of a flow chart for a method 700 of acquisition parameter adjustment, according to an embodiment of the present disclosure.

In an embodiment, at step 705, the fluoroscopy system can obtain a first image including projection data representing an intensity of X-rays, emitted from an X-ray source, detected by a plurality of detectors at a first X-ray exposure setting. For example, the first X-ray exposure setting is at a low dose or low radiation level, and the first image is a low-dose image.

In an embodiment, at step 710, the fluoroscopy system can determine whether an object of interest is disposed in the first image and, upon determining the first image includes the object of interest, determine first parameters of the first object of interest in the first image. For example, the first parameters of the first object of interest includes a first location of the first object of interest.

In an embodiment, at step 715, the fluoroscopy system can obtain a second image including the projection data representing the intensity of the X-rays, emitted from the X-ray source, detected by the plurality of detectors at the first X-ray exposure setting. Thus, the second image can also be a low-dose image.

In an embodiment, at step 720, the fluoroscopy system can determine second parameters of the first object of interest in the second image. For example, the second parameters of the first object of interest includes a second location of the first object of interest.

In an embodiment, at step 725, the fluoroscopy system can determine a difference between the first parameters and the second parameters of the first object of interest. For example, the difference between the first parameters and the second parameters is the difference (a distance) between the first location and the second location of the first object of interest.

In an embodiment, at step 730, the fluoroscopy system can determine whether the difference between the first parameters and the second parameters is greater than a predetermined threshold. That is, the fluoroscopy system can determine whether the first image and the second image are informative frames, or images with significant events occurring. For example, the predetermined threshold is determined based on a distance between the first location and the second location of the first object of interest. For example, the predetermined threshold is determined based on a size difference between a first size of the first object of interest in the first image and a second size of the first object of interest in the second image. For example, the predetermined threshold is determined based on a density difference between a first density of the first object of interest in the first image and a second density of the first object of interest in the second image.

In an embodiment, at step 730, upon determining the difference is not greater than the predetermined threshold, the fluoroscopy system can continue to obtain images at the first exposure setting by proceeding to step 705. That is, the first image and the second image are not informative frames, and therefore the low dose imaging can be used to continue imaging the first object of interest.

In an embodiment, at step 735, upon determining the difference is greater than the predetermined threshold, the fluoroscopy system can determine a second X-ray exposure setting for use in obtaining a third image. That is, the first image and the second image are informative frames with significant events occurring in the images. For example, the object of interest has had a significant repositioning.

In an embodiment, at step 740, the fluoroscopy system can obtain the third image including the projection data representing the intensity of the X-rays, emitted from the X-ray source, detected by the plurality of detectors at the second X-ray exposure setting. For example, the second X-ray exposure setting is at a high dose or high radiation level for obtaining the third image with less noise or higher image quality, and the third image can be a high-dose image.

With reference to FIG. 7B, in an embodiment, at step 745, the fluoroscopy system can determine third parameters of the first object of interest in the third image. For example, the third parameters of the first object of interest includes a third location of the first object of interest.

In an embodiment, at step 750, the fluoroscopy system can obtain a fourth image including the projection data representing the intensity of the X-rays, emitted from the X-ray source, detected by the plurality of detectors at the second X-ray exposure setting. Thus, the fourth image can also be a high-dose image.

In an embodiment, at step 755, the fluoroscopy system can determine fourth parameters of the first object of interest in the fourth image. For example, the fourth parameters of the first object of interest includes a fourth location of the first object of interest.

In an embodiment, at step 760, the fluoroscopy system can determine a difference between the third parameters and the fourth parameters of the first object of interest. For example, the difference between the third parameters and the fourth parameters is the difference (a distance) between the third location and the fourth location of the first object of interest.

In an embodiment, at step 765, the fluoroscopy system can determine whether the difference between the third parameters and the fourth parameters is greater than the predetermined threshold. That is, the fluoroscopy system can determine whether the third image and the fourth image are informative frames, or images with significant events occurring.

In an embodiment, at step 765, upon determining the difference is greater than the predetermined threshold, the fluoroscopy system can continue to obtain images at the second exposure setting by proceeding to step 740. That is, the third image and the fourth image are still informative frames, and therefore the high dose imaging can be used to continue imaging the first object of interest.

In an embodiment, at step 765, upon determining the difference is not greater than the predetermined threshold, the fluoroscopy system can revert to obtaining images, such as a fifth image, at the first exposure setting by proceeding to step 770. That is, the third image and the fourth image are not informative frames, and therefore the low dose imaging can be used to image the first object of interest again. It may be appreciated that at step 770, a third X-ray exposure setting can be determined for use in obtaining the fifth image instead of reverting to the first X-ray exposure setting.

FIG. 7C shows a non-limiting example of a flow chart for a method 702 of acquisition parameter adjustment, according to an embodiment of the present disclosure.

In an embodiment, at step 775, a sequence of training images is obtained, the sequence of training images sequentially acquired using a corresponding set of exposure parameters of an image scanning apparatus.

In an embodiment, at step 780, a pair of images of the sequence of training images is input into a first model to obtain an output set of exposure parameters, which is output from the first model.

In an embodiment, at step 785, a simulated image is generated based on the output set of exposure parameters.

In an embodiment, at step 790, the generated simulated image are input into a second model to obtain a restored image, which is output from the second model.

In an embodiment, at step 795, the restored image is compared to a corresponding target image, of an obtained sequence of target images, to generate an image error term.

In an embodiment, at step 797, the inputting, generating, inputting, and comparing steps are repeated for sequential pairs of the obtained sequence of training images.

FIG. 7D shows a non-limiting example of a flow chart for a method 702 of acquisition parameter adjustment, according to an embodiment of the present disclosure.

In an embodiment, at step 805, a sequence of a plurality of images including a first image and a second image is obtained. The first and second images are acquired sequentially using a first set of exposure parameters of an image scanning apparatus.

In an embodiment, at step 810, the obtained first and second images are input into a trained first model to obtain a second set of exposure parameters, which is output from the trained first model.

In an embodiment, at step 815, a third image is obtained that was acquired by the image scanning apparatus using the obtained second set of exposure parameters.

In an embodiment, at step 820, at least the obtained second image and the obtained third image are input into a trained second model to obtain a restored third image, which is output from the trained second model.

In an embodiment, at step 825, the restored third image is output.

Figure 8A:
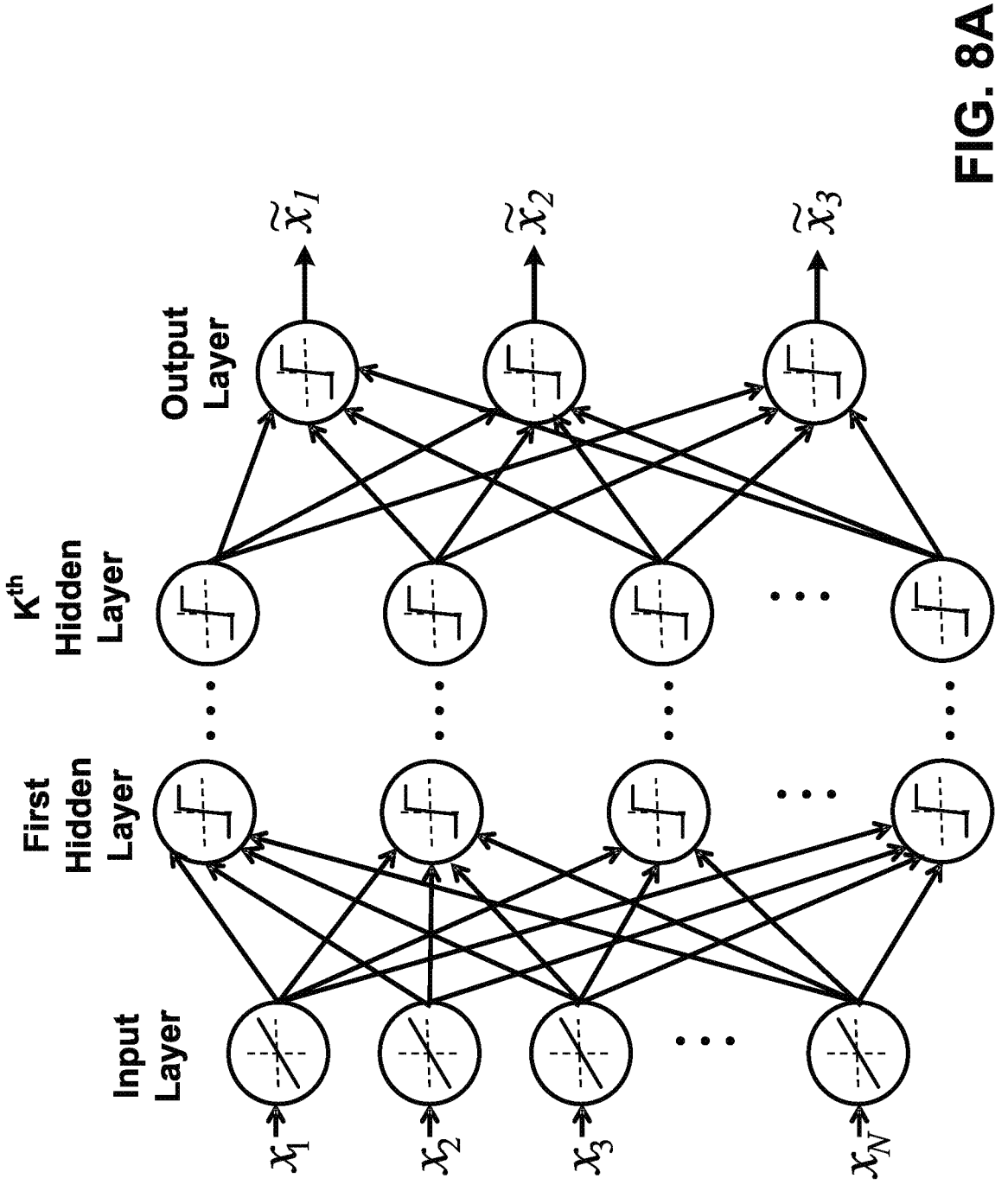
FIG. 8A shows an example of a general artificial neural network (ANN) having N inputs, K hidden layers, and three outputs, according to an embodiment of the present disclosure.
Figure 8B:
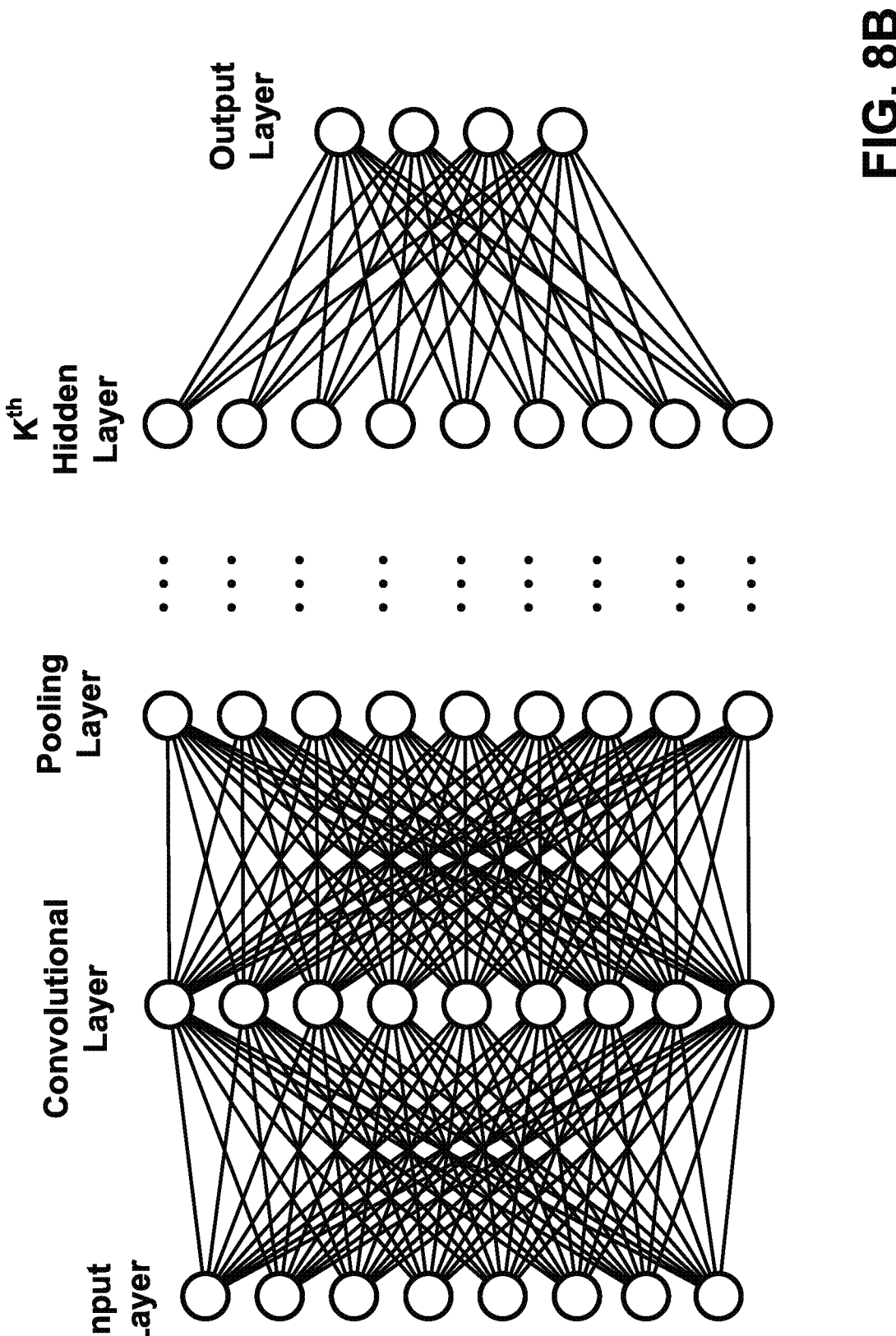
FIG. 8B shows a non-limiting example of a convolutional neural network (CNN), as in the present disclosure.

FIGS. 8A and 8B show various examples of a deep learning (DL) network.

FIG. 8A shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers, and is called an autoencoder. The DL network generally has more than three layers of neurons, and has as many outputs neurons IN as input neurons, wherein N is the number of pixels in the reconstructed image (sinogram). The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function $m(x)$ is defined as a composition of other functions $n_i(x)$, which can further be defined as a composition of other functions. This can be conveniently represented as a network structure, with arrows depicting the dependencies between variables, as shown in the figures. For example, the ANN can use a nonlinear weighted sum, wherein $m(x)=K(\Sigma_i w_i n_i(x))$, where K (commonly referred to as the activation function) is some predefined function, such as the hyperbolic tangent.

In FIG. 8A (and similarly in FIG. 8B), the neurons (i.e., nodes) are depicted by circles around a threshold function. In certain implementations, the DL network is a feedforward network as described in FIGS. 8A and 8B (e.g., it can be represented as a directed acyclic graph).

The DL network operates to achieve a specific task, such as denoising an image, by searching within the class of functions F to learn, using a set of observations, to find $m^* \in F$ which solves the specific task in some optimal sense. For example, in certain implementations, this can be achieved by defining a cost function $C:F \rightarrow m$ such that, for the optimal solution $m^*$, $C(m^*) \leq C(m) \forall m \in F$ (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

FIG. 8B shows a non-limiting example in which the DL network is a convolutional neural network (CNN). CNNs are type of ANN that has beneficial properties for image processing, and, therefore, have specially relevancy for the applications of image denoising and sinogram restoration. CNNs use feed-forward ANNs in which the connectivity pattern between neurons can represent convolutions in image processing. For example, CNNs can be used for image-processing optimization by using multiple layers of small neuron collections which process portions of the input image, called receptive fields. The outputs of these collections can then tiled so that they overlap, to obtain a better representation of the original image. This processing pattern can be repeated over multiple layers having alternating convolution and pooling layers.

As generally applied above, following after a convolution layer, a CNN can include local and/or global pooling layers which combine the outputs of neuron clusters in the convolution layers. Additionally, in certain implementations, the CNN can also include various combinations of convolutional and fully connected layers, with pointwise nonlinearity applied at the end of or after each layer.

Figure 9:
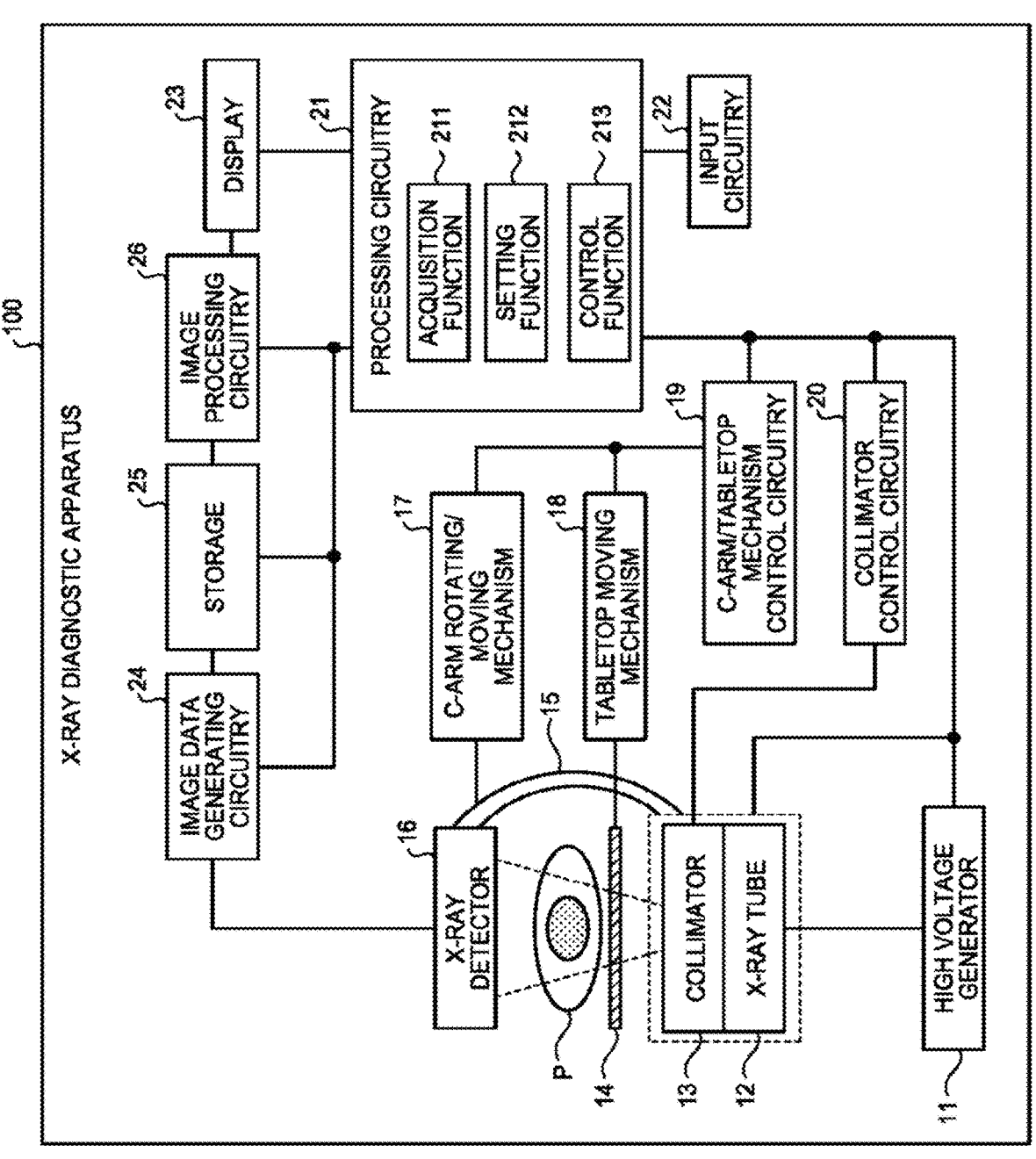
FIG. 9 is a block diagram of an X-ray apparatus, according to an embodiment of the present disclosure.

FIG. 9 is a diagram illustrating a configuration of an X-ray diagnostic apparatus 100 according to an embodiment. As illustrated, the X-ray diagnostic apparatus 100 includes a high voltage generator 11, an X-ray tube 12, a collimator 13, a tabletop 14, a C-arm 15, an X-ray detector 16, a C-arm rotating/moving mechanism 17, a tabletop moving mechanism 18, C-arm/tabletop mechanism control circuitry 19, collimator control circuitry 20, processing circuitry 21, input circuitry 22, a display 23, image data generating circuitry 24, a storage 25, and image processing circuitry 26.

In the X-ray diagnostic apparatus 100, each processing function is stored in the storage 25 in the form of a computer program executable by a computer. The C-arm/tabletop mechanism control circuitry 19, the collimator control circuitry 20, the processing circuitry 21, the image data generating circuitry 24, and the image processing circuitry 26 are a processor that reads a computer program from the storage 25 and executes the computer program to implement the function corresponding to the computer program. In other words, each circuit in a state in which a computer program is read has the function corresponding to the read computer program.

The term "processor" used in the description above means, for example, a central processing unit (CPU), a graphics processing unit (GPU), or a circuit such as an application specific integrated circuit (ASIC) and a programmable logic device (for example, simple programmable logic device (SPLD), complex programmable logic device (CPLD), and a field programmable gate array (FPGA)). The processor reads and executes a computer program stored in the storage circuit to implement the function. The computer program may be directly built in a circuit in the processor, rather than being stored in a storage circuit. In this case, the processor implements the function by reading and executing the computer program built in the circuit. Each processor in the present embodiment may not be configured as a single circuit, but a plurality of independent circuits may be combined into a single processor, which implements the function.

The high voltage generator 11 generates high voltage and supplies the generated high voltage to the X-ray tube 12, under control by the processing circuitry 21. The X-ray tube 12 generates X-rays using the high voltage supplied from the high voltage generator 11.

The collimator 13 narrows X-rays produced by the X-ray tube 12 such that the X-rays are selectively applied to a region of interest of a subject P, under control by the collimator control circuitry 20. For example, the collimator 13 has four slidable collimator blades. The collimator 13 allows these collimator blades to slide under control by the collimator control circuitry 20 and thereby narrows the X-rays produced by the X-ray tube 12 to apply the narrowed X-rays to the subject P. The collimator 13 also includes an additional filter for adjusting the radiation quality. The additional filter is set, for example, depending on tests. The tabletop 14 is a bed on which the subject P lies and is disposed on a not-illustrated table (couch). The subject P is not included in the X-ray diagnostic apparatus 100.

The X-ray detector 16 detects X-rays transmitted through the subject P. For example, the X-ray detector 16 includes detecting elements arranged in a matrix. Each detecting element converts X-rays transmitted through the subject P into an electrical signal, accumulates the electrical signals, and transmits the accumulated electrical signals to the image data generating circuitry 24.

The C-arm 15 holds the X-ray tube 12, the collimator 13, and the X-ray detector 16. The C-arm 15 is rotated fast like a propeller around the subject P lying on the tabletop 14, by a motor provided at a support (not illustrated). Here, the C-arm 15 is rotatably supported with respect to three axes orthogonal to each other, namely, the XYZ axes, and is rotated individually in each axis by a not-illustrated driver. The X-ray tube 12 and the collimator 13 are disposed to be opposed to the X-ray detector 16 by means of the C-arm 15 with the subject P interposed. Although the X-ray diagnostic apparatus 100 is a single-plane system by way of example, embodiments are not limited thereto and may employ a biplane system.

The C-arm rotating/moving mechanism 17 is a mechanism for rotating and moving the C-arm 15. The C-arm rotating/moving mechanism 17 can also change a source image receptor distance (SID) which is the distance between the X-ray tube 12 and the X-ray detector 16. The C-arm rotating/moving mechanism 17 can also rotate the X-ray detector 16 held by the C-arm 15. The tabletop moving mechanism 18 is a mechanism for moving the tabletop 14.

The C-arm/tabletop mechanism control circuitry 19 controls the C-arm rotating/moving mechanism 17 and the tabletop moving mechanism 18 under control by the processing circuitry 21 to adjust the rotation and movement of the C-arm 15 and the movement of the tabletop 14. For example, the C-arm/tabletop mechanism control circuitry 19 controls rotation imaging to collect projection data at a predetermined frame rate while rotating the C-arm 15, under control by the processing circuitry 21. The collimator control circuitry 20 controls the radiation range of X-rays applied to the subject P by adjusting the aperture of the collimator blades of the collimator 13, under control by the processing circuitry 21.

The image data generating circuitry 24 generates projection data using the electrical signal obtained through conversion of X-rays by the X-ray detector 16 and stores the generated projection data into the storage 25. For example, the image data generating circuitry 24 performs current-voltage conversion, analog-digital (A/D) conversion, and parallel-serial conversion on the electrical signal received from the X-ray detector 16 to generate projection data. The image data generating circuitry 24 then stores the generated projection data into the storage 25.

The storage 25 accepts and stores the projection data generated by the image data generating circuitry 24. The storage 25 stores computer programs corresponding to various functions to be read and executed by the circuits illustrated. As an example, the storage 25 stores a computer program corresponding to an acquisition function 211, a computer program corresponding to a setting function 212, and a computer program corresponding to a control function 213 to be read and executed by the processing circuitry 21.

The image processing circuitry 26 performs various image processing on the projection data stored in the storage 25 to generate an X-ray image, under control by the processing circuitry 21 described later. Alternatively, the image processing circuitry 26 directly acquires projection data from the image data generating circuitry 24 and performs various image processing on the acquired projection data to generate an X-ray image, under control by the processing circuitry 21 described later. The image processing circuitry 26 may store the processed X-ray image into the storage 25. For example, the image processing circuitry 26 can execute various processing with image processing filters such as moving average (smoothing) filter, Gaussian filter, median filter, recursive filter, and bandpass filter.

The image processing circuitry 26 also forms reconstruction data (volume data) from projection data collected by rotation imaging. The image processing circuitry 26 then stores the reconstructed volume data into the storage 25. The image processing circuitry 26 generates a three-dimensional image from volume data. For example, the image processing circuitry 26 generates a volume rendering image or a multi planar reconstruction (MPR) image from volume data. The image processing circuitry 26 then stores the generated three-dimensional image into the storage 25. It is noted that the image processing circuitry 26 is an example of the reconstruction circuitry, which can be described or referenced in the claims.

The input circuitry 22 is implemented by, for example, a trackball, a switch button, a mouse, and a keyboard for setting a predetermined region (for example, a region of interest such as a section concerned), and a footswitch for emitting X-rays. The input circuitry 22 is connected to the processing circuitry 21 and converts an input operation accepted from the operator into an electrical signal for output to the processing circuitry 21. The display 23 displays a graphical user interface (GUI) for accepting the operator's instruction and a variety of images generated by the image processing circuitry 26.

The processing circuitry 21 controls the operation of the entire X-ray diagnostic apparatus 100. Specifically, the processing circuitry 21 executes various processing by reading a computer program corresponding to the control function 213 for controlling the entire apparatus from the storage 25 for execution. For example, the control function 213 controls an X-ray radiation dose to be applied to the subject P and ON/OFF by controlling the high voltage generator 11 in accordance with the operator's instruction forwarded from the input circuitry 22 and adjusting the voltage supplied to the X-ray tube 12. For example, the control function 213 controls the C-arm/tabletop mechanism control circuitry 19 in accordance with the operator's instruction and adjusts the rotation and movement of the C-arm 15 and the movement of the tabletop 14. For example, the control function 213 controls the radiation range of X-rays applied to the subject P by controlling the collimator control circuitry 20 in accordance with the operator's instruction and adjusting the aperture of the collimator blades of the collimator 13.

The control function 213 also controls, for example, the image data generation processing by the image data generating circuitry 24 and the image processing or the analysis processing by the image processing circuitry 26 in accordance with the operator's instruction. The control function 213 also performs control such that a GUI for accepting the operator's instruction or an image stored in the storage 25 appears on the display 23.

In an embodiment, the processing circuitry 21 executes the control function 213 described above as well as the acquisition function 211 and the setting function 212. It is noted that the processing circuitry 21 is an example of the processing circuitry in the claims.

Embodiments of the radiation detector apparatus data and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus, such as a networked device or server, user devices, and the like. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

According to an embodiment, the processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

In another embodiment, the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

Figure 10:
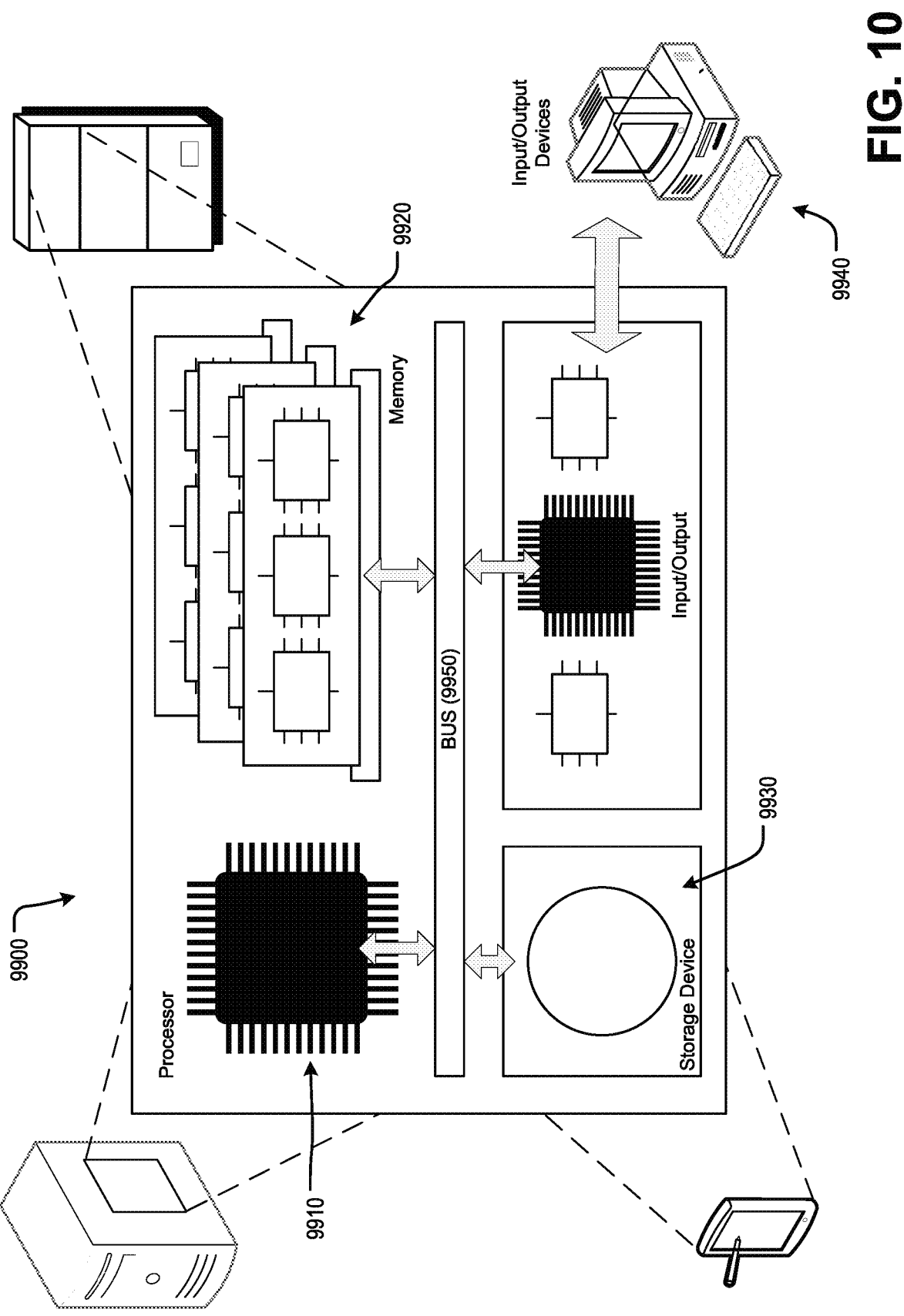
FIG. 10 is a schematic of a hardware system for performing a method, according to an embodiment of the present disclosure.

An example of a type of computer is shown in FIG. 10. The computer 9900 can be used for the operations described in association with any of the computer-implement methods described previously, according to one implementation. For example, the computer 9900 can be an example of devices 125, 135, 151, or a server (such as the server 190). The computer 9900 includes processing circuitry, as discussed above. The provider server 190 and the client server 191 can include other components not explicitly illustrated in FIG. 10 such as a CPU, GPU, frame buffer, etc. The processing circuitry includes one or more of the elements discussed next with reference to FIG. 10. In FIG. 10, the computer 9900 includes a processor 9910, a memory 9920, a storage device 9930, and an input/output device 9940. Each of the components 9910, 9920, 9930, and 9940 are interconnected using a system bus 9950. The processor 9910 is capable of processing instructions for execution within the system 9900. In one implementation, the processor 9910 is a single-threaded processor. In another implementation, the processor 9910 is a multi-threaded processor. The processor 9910 is capable of processing instructions stored in the memory 9920 or on the storage device 9930 to display graphical information for a user interface on the input/output device 9940.

The memory 9920 stores information within the computer 9900. In one implementation, the memory 9920 is a computer-readable medium. In one implementation, the memory 9920 is a volatile memory unit. In another implementation, the memory 9920 is a non-volatile memory unit.

The storage device 9930 is capable of providing mass storage for the computer 9900. In one implementation, the storage device 9930 is a computer-readable medium. In various different implementations, the storage device 9930 may be a floppy disk device, a hard disk device, an optical disk device, or a tape device.

The input/output device 9940 provides input/output operations for the computer 9900. In one implementation, the input/output device 9940 includes a keyboard and/or pointing device. In another implementation, the input/output device 9940 includes a display unit for displaying graphical user interfaces.

Figure 11:
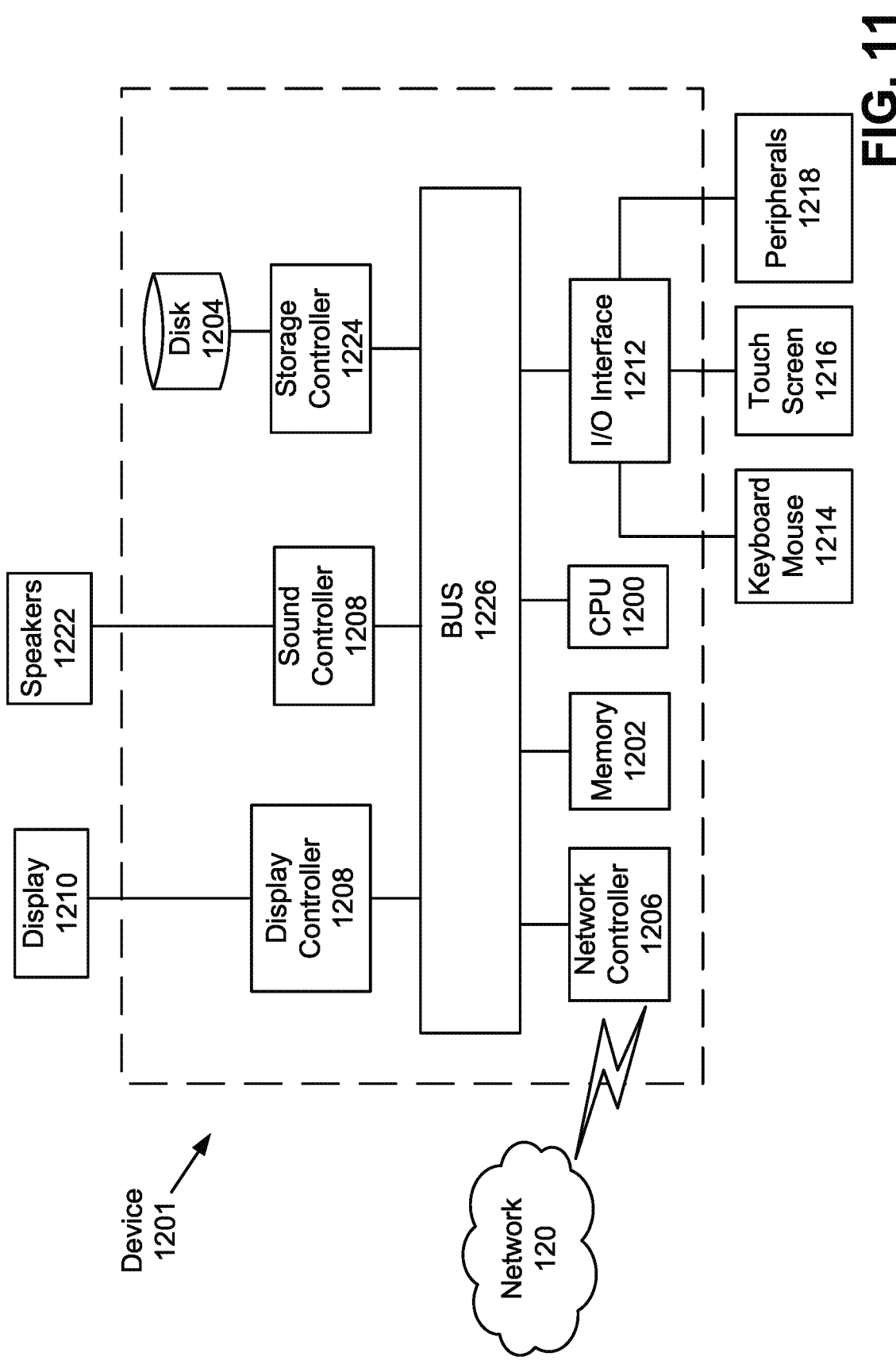
FIG. 11 is a schematic of a hardware configuration of a device for performing a method, according to an embodiment of the present disclosure.

Next, a hardware description of a device according to the present embodiments is described with reference to FIG. 11. In FIG. 11, the device 1201, includes processing circuitry, as discussed above. The processing circuitry includes one or more of the elements discussed next with reference to FIG. 11. The device can include other components not explicitly illustrated in FIG. 11, such as a CPU, GPU, frame buffer, etc. In FIG. 11, the device includes a CPU 1200 which performs the processes described above/below. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 1201 communicates, such as a server or computer.

Further, the claimed advancements may be provided as a utility application, background daemon, or component of an operating system, or combination thereof, executing in conjunction with CPU 1200 and an operating system such as Microsoft Windows, UNIX, Solaris, LINUX, Apple MAC-OS and other systems known to those skilled in the art.

The hardware elements in order to achieve the device 1201 may be realized by various circuitry elements, known to those skilled in the art. For example, CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the processes described above.

The device in FIG. 11 also includes a network controller 1206, such as an Intel Ethernet PRO network interface card from Intel Corporation of America, for interfacing with network 120, and to communicate with the other devices. As can be appreciated, the network 120 can be a public network, such as the Internet, or a private network such as an LAN or WAN network, or any combination thereof and can also include PSTN or ISDN sub-networks. The network 120 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 1208, such as a NVIDIA Geforce GTX or Quadro graphics adaptor from NVIDIA Corporation of America for interfacing with display 1210, such as an LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners.

A sound controller 1220 is also provided in the device 1201 to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/ or described operations may be omitted in additional embodiments.

Embodiments of the present disclosure may also be as set forth in the following parentheticals.

(1) An X-ray diagnosis apparatus, including processing circuitry configured to obtain a sequence of a plurality of X-ray images including a first X-ray image and a second X-ray image, the first and second X-ray images being acquired sequentially using a first set of exposure parameters of an image scanning apparatus, input the obtained first and second X-ray images into a trained first model to obtain a second set of exposure parameters, which is output from the trained first model, obtain a third X-ray image that was acquired by the image scanning apparatus using the obtained second set of exposure parameters, input at least the obtained second X-ray image and the obtained third X-ray image into a trained second model to obtain a restored third X-ray image, which is output from the trained second model, and output the restored third X-ray image, wherein the first model and the second model were trained together using a training sequence of X-ray images in a training process, and during the training process, inputs to the second model are based on outputs of the first model, and the second model outputs a sequence of restored X-ray images based on the training sequence of images.

(2) The apparatus of (1), wherein the processing circuitry is further configured to train the first model using a first loss function having a first term representing a total dosage used in acquiring the training sequence of X-ray images and a second term representing a total error in the sequence of restored X-ray images, and train the second model using a second loss function having a term representing the total error in the sequence of restored X-ray images.

(3) The apparatus of either (2) or (3), wherein the first set of exposure parameters includes a first dose level and the second set of exposure parameters includes a second dose level, the first dose level being lower than the second dose level.

(4) The apparatus of any one of (1) to (3), wherein the first model and the second model are neural network models.

(5) The apparatus of any one of (1) to (4), wherein the image scanning apparatus is an X-ray apparatus.

(6) The apparatus of any one of (1) to (5), wherein the first model and the second model are alternatively trained during the training process.

(7) An X-ray diagnosis apparatus, including processing circuitry configured to perform a training process by obtaining a sequence of training X-ray images sequentially acquired using a corresponding set of exposure parameters of an image scanning apparatus, inputting a pair of X-ray images of the sequence of training X-ray images into a first model to obtain an output set of exposure parameters, which is output from the first model, generating a simulated X-ray image based on the output set of exposure parameters, inputting the generated simulated X-ray image into a second model to obtain a restored X-ray image, which is output from the second model, comparing the restored X-ray image to a corresponding target X-ray image, of an obtained sequence of target X-ray images, to generate an image error term, repeating the inputting, generating, inputting, and comparing steps for sequential pairs of the obtained sequence of training X-ray images, and updating one of the first model and the second model.

(8) The apparatus of (7), wherein the processing circuitry is further configured to perform the training process by updating the first model using a first loss function having a first term representing a total dosage used in acquiring the training sequence of X-ray images and a second term representing a total of the image error terms for the sequence of restored X-ray images, and updating the second model using a second loss function having a term representing the total of the image error terms for the sequence of restored X-ray images.

(9) The apparatus of either (7) or (8), wherein, in the updating, the processing circuitry is further configured to update the first model using the first loss function while keeping the second model fixed, and update the second model using the second loss function while keeping the first model fixed.

(10) The apparatus of any one of (7) to (9), wherein, in the updating, the processing circuitry is further configured to repeat the training process for another sequence of training X-ray images sequentially acquired using another corresponding set of exposure parameters and another sequence of target X-ray images.

(11) The apparatus of any one of (7) to (10), wherein the step of inputting the generated simulated X-ray image into the second model further comprises inputting another simulated X-ray image into the second model together with the simulated X-ray image, the another simulated X-ray image being generated based on another set of exposure parameters.

(12) The apparatus of any one of (7) to (11), wherein the first model and the second model are neural network models.

(13) The apparatus of any one of (7) to (12), wherein the obtaining step comprising obtaining the training X-ray images using clinical X-ray images or X-ray images obtaining from imaging a phantom.

(14) The apparatus of any one of (7) to (13), wherein, in the generating, the processing circuitry is further configured to generate a projection without any degradation based on a digital phantom, and generate the simulated X-ray image from the generated projection based on the output set of exposure parameters.

(15) A method, including obtaining a sequence of a plurality of X-ray images including a first X-ray image and a second X-ray image, the first and second X-ray images being acquired sequentially using a first set of exposure parameters of an image scanning apparatus; inputting the obtained first and second X-ray images into a trained first model to obtain a second set of exposure parameters, which is output from the trained first model; obtaining a third X-ray image that was acquired by the image scanning apparatus using the obtained second set of exposure parameters; inputting at least the obtained second X-ray image and the obtained third X-ray image into a trained second model to obtain a restored X-ray third image, which is output from the trained second model; and outputting the restored X-ray third image, wherein the first model and the second model were trained together using a training sequence of images in a training process, and during the training process, inputs to the second model are based on outputs of the first model, and the second model outputs a sequence of restored X-ray images based on the training sequence of images.

(16) The method of (15), further comprising training the first model using a first loss function having a first term representing a total dosage used in acquiring the training sequence of X-ray images and a second term representing a total error in the sequence of restored X-ray images, and training the second model using a second loss function having a term representing the total error in the sequence of restored X-ray images.

(17) The method of either (15) or (16), wherein the first set of exposure parameters includes a first dose level and the second set of exposure parameters includes a second dose level, the first dose level being lower than the second dose level.

(18) The method of any one of (15) to (17), wherein the first model and the second model are neural network models.

(19) The method of any one of (15) to (18), wherein the image scanning apparatus is an X-ray apparatus.

(20) The method of any one of (15) to (19), wherein the first model and the second model are alternatively trained during the training process.

(21) A method for performing a training process, including obtaining a sequence of training images sequentially acquired using a corresponding set of exposure parameters of an image scanning apparatus, inputting a pair of images of the sequence of training images into a first model to obtain an output set of exposure parameters, which is output from the first model, generating a simulated image based on the output set of exposure parameters, inputting the generated simulated image into a second model to obtain a restored image, which is output from the second model, comparing the restored image to a corresponding target image, of an obtained sequence of target images, to generate an image error term, repeating the inputting, generating, inputting, and comparing steps for sequential pairs of the obtained sequence of training images, and updating one of the first model and the second model, wherein the first model is updated using a first loss function having a first term representing a total dosage used in acquiring the training sequence of images and a second term representing a total of the image error terms for the sequence of restored images, and the second model is updated using a second loss function having a term representing the total of the image error terms for the sequence of restored images.

(22) A non-transitory computer-readable storage medium including executable instructions, which when executed by circuitry, cause the circuitry to perform a method of obtaining a sequence of a plurality of images including a first image and a second image, the first and second images being acquired sequentially using a first set of exposure parameters of an image scanning apparatus; inputting the obtained first and second images into a trained first model to obtain a second set of exposure parameters, which is output from the trained first model; obtaining a third image that was acquired by the image scanning apparatus using the obtained second set of exposure parameters; inputting at least the obtained second image and the obtained third image into a trained second model to obtain a restored third image, which is output from the trained second model; and outputting the restored third image, wherein the first model and the second model were trained together using a training sequence of images in a training process, during the training process, inputs to the second model are based on outputs of the first model, and the second model outputs a sequence of restored images based on the training sequence of images, the first model was trained using a first loss function having a first term representing a total dosage used in acquiring the training sequence of images and a second term representing a total error in the sequence of restored images, and the second model was trained using a second loss function having a term representing the total error in the sequence of restored images.

(23) A non-transitory computer-readable storage medium including executable instructions, which when executed by circuitry, cause the circuitry to perform a method of obtaining a sequence of training images sequentially acquired using a corresponding set of exposure parameters of an image scanning apparatus, inputting a pair of images of the sequence of training images into a first model to obtain an output set of exposure parameters, which is output from the first model, generating a simulated image based on the output set of exposure parameters, inputting the generated simulated image into a second model to obtain a restored image, which is output from the second model, comparing the restored image to a corresponding target image, of an obtained sequence of target images, to generate an image error term, repeating the inputting, generating, inputting, and comparing steps for sequential pairs of the obtained sequence of training images, and updating one of the first model and the second model, wherein the first model is updated using a first loss function having a first term representing a total dosage used in acquiring the training sequence of images and a second term representing a total of the image error terms for the sequence of restored images, and the second model is updated using a second loss function having a term representing the total of the image error terms for the sequence of restored images.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An X-ray diagnosis apparatus, comprising:
processing circuitry configured to
   obtain a sequence of a plurality of X-ray images including a first X-ray image and a second X-ray image, the first and second X-ray images being acquired sequentially using a first set of exposure parameters of an image scanning apparatus,
   input the obtained first and second X-ray images into a trained first model to obtain a second set of exposure parameters, which is output from the trained first model,
   obtain a third X-ray image that was acquired by the image scanning apparatus using the obtained second set of exposure parameters,
   input at least the obtained second X-ray image and the obtained third X-ray image into a trained second model to obtain a restored third X-ray image, which is output from the trained second model, and
   output the restored third X-ray image,
wherein the first model and the second model were trained together using a training sequence of X-ray images in a training process, and during the training process, inputs to the second model are based on outputs of the first model, and the second model outputs a sequence of restored X-ray images based on the training sequence of images.

2. The X-ray diagnosis apparatus of claim 1, wherein the processing circuitry is further configured to:

train the first model using a first loss function having a first term representing a total dosage used in acquiring the training sequence of X-ray images and a second term representing a total error in the sequence of restored X-ray images, and train the second model using a second loss function having a term representing the total error in the sequence of restored X-ray images.

3. The apparatus of claim 1, wherein the first set of exposure parameters includes a first dose level and the second set of exposure parameters includes a second dose level, the first dose level being lower than the second dose level.

4. The apparatus of claim 1, wherein the first model and the second model are neural network models.

5. The apparatus of claim 1, wherein the image scanning apparatus is an X-ray apparatus.

6. The apparatus of claim 1, wherein the first model and the second model are alternatively trained during the training process.

7. An X-ray diagnosis apparatus, comprising:

processing circuitry configured to perform a training process by obtaining a sequence of training X-ray images sequentially acquired using a corresponding set of exposure parameters of an image scanning apparatus, inputting a pair of X-ray images of the sequence of training X-ray images into a first model to obtain an output set of exposure parameters, which is output from the first model, generating a simulated X-ray image based on the output set of exposure parameters, inputting the generated simulated X-ray image into a second model to obtain a restored X-ray image, which is output from the second model, comparing the restored X-ray image to a corresponding target X-ray image, of an obtained sequence of target X-ray images, to generate an image error term, repeating the inputting, generating, inputting, and comparing steps for sequential pairs of the obtained sequence of training X-ray images, and updating one of the first model and the second model.

8. The apparatus of claim 7, wherein the processing circuitry is further configured to perform the training process by updating the first model using a first loss function having a first term representing a total dosage used in acquiring the training sequence of X-ray images and a second term representing a total of the image error terms for the sequence of restored X-ray images, and updating the second model using a second loss function having a term representing the total of the image error terms for the sequence of restored X-ray images.

9. The apparatus of claim 8, wherein, in the updating, the processing circuitry is further configured to:

update the first model using the first loss function while keeping the second model fixed, and update the second model using the second loss function while keeping the first model fixed.

10. The apparatus of claim 7, wherein, in the updating, the processing circuitry is further configured to repeat the training process for another sequence of training X-ray images sequentially acquired using another corresponding set of exposure parameters and another sequence of target X-ray images.

11. The apparatus of claim 7, wherein the step of inputting the generated simulated X-ray image into the second model further comprises inputting another simulated X-ray image into the second model together with the simulated X-ray image, the another simulated X-ray image being generated based on another set of exposure parameters.

12. The apparatus of claim 7, wherein the first model and the second model are neural network models.

13. The apparatus of claim 7, wherein the obtaining step comprising obtaining the training X-ray images using clinical X-ray images or X-ray images obtaining from imaging a phantom.

14. The apparatus of claim 7, wherein, in the generating, the processing circuitry is further configured to generate a projection without any degradation based on a digital phantom, and generate the simulated X-ray image from the generated projection based on the output set of exposure parameters.

15. A method, comprising:

obtaining a sequence of a plurality of X-ray images including a first X-ray image and a second X-ray image, the first and second X-ray images being acquired sequentially using a first set of exposure parameters of an image scanning apparatus;

inputting the obtained first and second X-ray images into a trained first model to obtain a second set of exposure parameters, which is output from the trained first model;

obtaining a third X-ray image that was acquired by the image scanning apparatus using the obtained second set of exposure parameters;

inputting at least the obtained second X-ray image and the obtained third X-ray image into a trained second model to obtain a restored X-ray third image, which is output from the trained second model; and outputting the restored X-ray third image, wherein the first model and the second model were trained together using a training sequence of images in a training process, and during the training process, inputs to the second model are based on outputs of the first model, and the second model outputs a sequence of restored X-ray images based on the training sequence of images.

16. The method of claim 15, further comprising:

training the first model using a first loss function having a first term representing a total dosage used in acquiring the training sequence of X-ray images and a second term representing a total error in the sequence of restored X-ray images, and training the second model using a second loss function having a term representing the total error in the sequence of restored X-ray images.

17. The method of claim 15, wherein the first set of exposure parameters includes a first dose level and the second set of exposure parameters includes a second dose level, the first dose level being lower than the second dose level.

18. The method of claim 15, wherein the first model and the second model are neural network models.

19. The method of claim 15, wherein the image scanning apparatus is an X-ray apparatus.

20. The method of claim 15, wherein the first model and the second model are alternatively trained during the training process.

\* \* \* \* \*